United States Patent
Ishiko et al.

(12)

(10) Patent No.: US 8,970,695 B2
(45) Date of Patent: Mar. 3, 2015

(54) IMAGE PROCESSING DEVICE, IMAGE PROCESSING SYSTEM, CAMERA DEVICE, IMAGE PROCESSING METHOD, AND PROGRAM

(75) Inventors: Masatsugu Ishiko, Kanagawa (JP);
Hitoshi Ozawa, Kanagawa (JP);
Takanobu Kobashiri, Kanagawa (JP);
Akitaka Fukata, Kanagawa (JP);
Munehiro Shimomura, Kanagawa (JP);
Kyosuke Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 12/656,046

(22) Filed: Jan. 14, 2010

(65) Prior Publication Data
US 2010/0220194 A1    Sep. 2, 2010

(30) Foreign Application Priority Data

Feb. 27, 2009  (JP) ................................. 2009-045512
May 8, 2009    (JP) ................................. 2009-113884

(51) Int. Cl.
| H04N 7/00 | (2011.01) |
| H04N 5/225 | (2006.01) |
| H04N 7/173 | (2011.01) |
| H04N 5/232 | (2006.01) |
| H04N 21/2187 | (2011.01) |

(Continued)

(52) U.S. Cl.
CPC .......... *H04N 7/173* (2013.01); *H04N 5/23229* (2013.01); *H04N 5/23232* (2013.01); *H04N 21/2187* (2013.01); *H04N 21/4223* (2013.01); *H04N 21/44008* (2013.01); *H04N 21/440263* (2013.01)

USPC ............................................ 348/143; 348/169

(58) Field of Classification Search
CPC .......... H04N 5/23229; H04N 5/23232; H04N 7/173; H04N 21/440263; H04N 21/4223; H04N 21/44008; H04N 21/2187
USPC .................................................. 348/143, 169
See application file for complete search history.

(56) References Cited

U.S. PATENT DOCUMENTS

2004/0223058 A1*  11/2004  Richter et al. ............. 348/207.1
2005/0169367 A1    8/2005   Venetianer et al.

(Continued)

FOREIGN PATENT DOCUMENTS

JP   2005-210573 A   8/2005
JP   2005-218054 A   8/2005

(Continued)

OTHER PUBLICATIONS

Japanese Office Action issued Feb. 1, 2011 for corresponding Japanese Application No. 2009-113884.

*Primary Examiner* — David X Yi
(74) *Attorney, Agent, or Firm* — Rader, Fishman & Grauer PLLC

(57) ABSTRACT

An image processing device includes: a detecting section configured to detect a plurality of objects by type from one input image; a generating section configured to generate image data on each of the objects detected by the detecting section as images of respective different picture frames by types of the objects; and a processing section configured to subject the images of the different picture frames, the images of the different picture frames being generated by the generating section, to processing according to one of a setting and a request.

18 Claims, 24 Drawing Sheets

(51) Int. Cl.
*H04N 21/4223* (2011.01)
*H04N 21/44* (2011.01)
*H04N 21/4402* (2011.01)

(56) References Cited

U.S. PATENT DOCUMENTS

2009/0022403 A1 1/2009 Takamori et al.
2010/0220194 A1* 9/2010 Ishiko et al. .................. 348/169

FOREIGN PATENT DOCUMENTS

| | | |
|---|---|---|
| JP | 2005-328236 A | 11/2005 |
| JP | 2006-033380 A | 2/2006 |
| JP | 2006-217070 | 8/2006 |
| JP | 2006-238102 A | 9/2006 |
| JP | 2007-115188 A | 5/2007 |
| JP | 2007-300456 A | 11/2007 |
| JP | 2008-167127 A | 7/2008 |
| JP | 2009-500917 T | 1/2009 |
| JP | 2009-048620 A | 3/2009 |

* cited by examiner

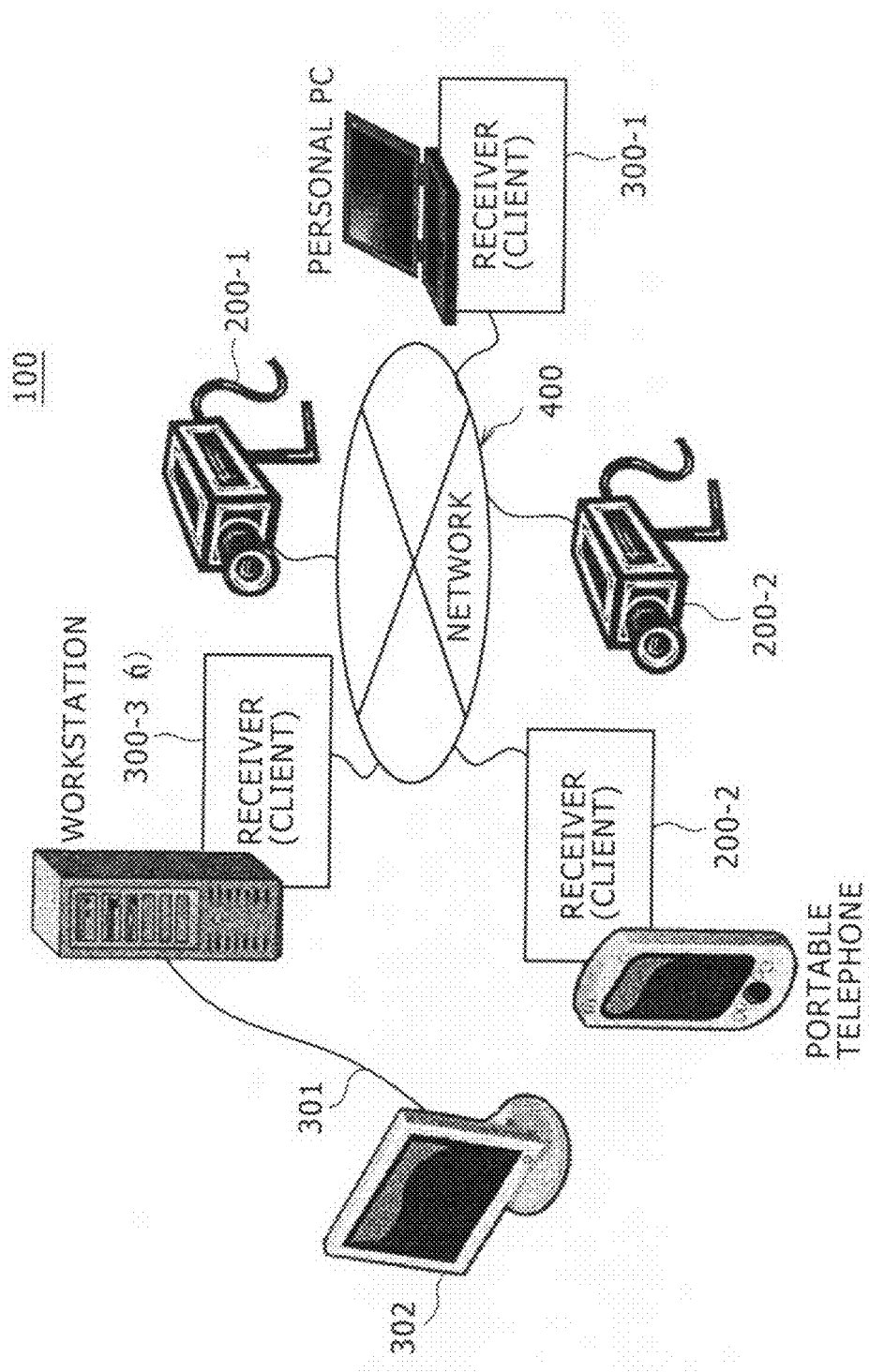

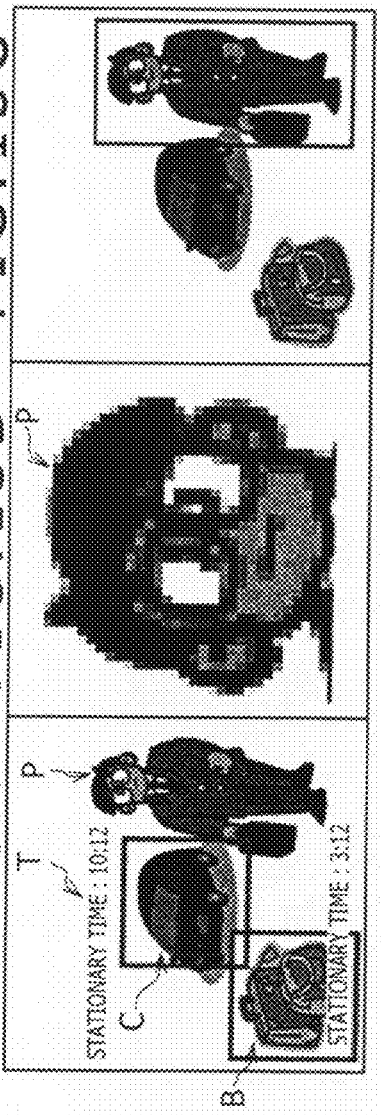
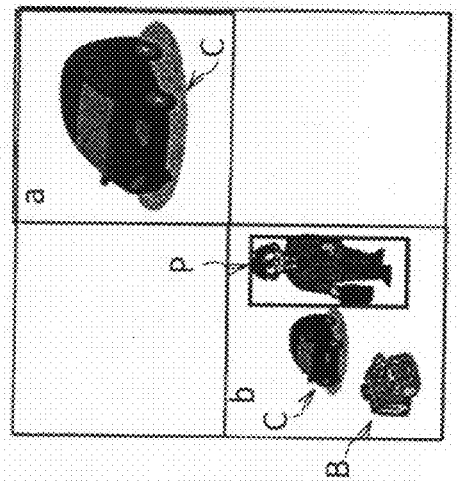

IMAGE IN CASE OF SYNTHESIZED IMAGE

REDUCE BIT QUANTITY TO MINIMUM

ENHANCE IMAGE QUALITY BY ASSIGNING BIT QUANTITY OBTAINED BY REDUCTION OF BIT QUANTITY TO MOVING OBJECT

IMAGE IN CASE OF REGION OF INTEREST OF HIGH IMAGE QUALITY

IMAGE QUALITY IS ENHANCED BECAUSE OF REGION OF INTEREST

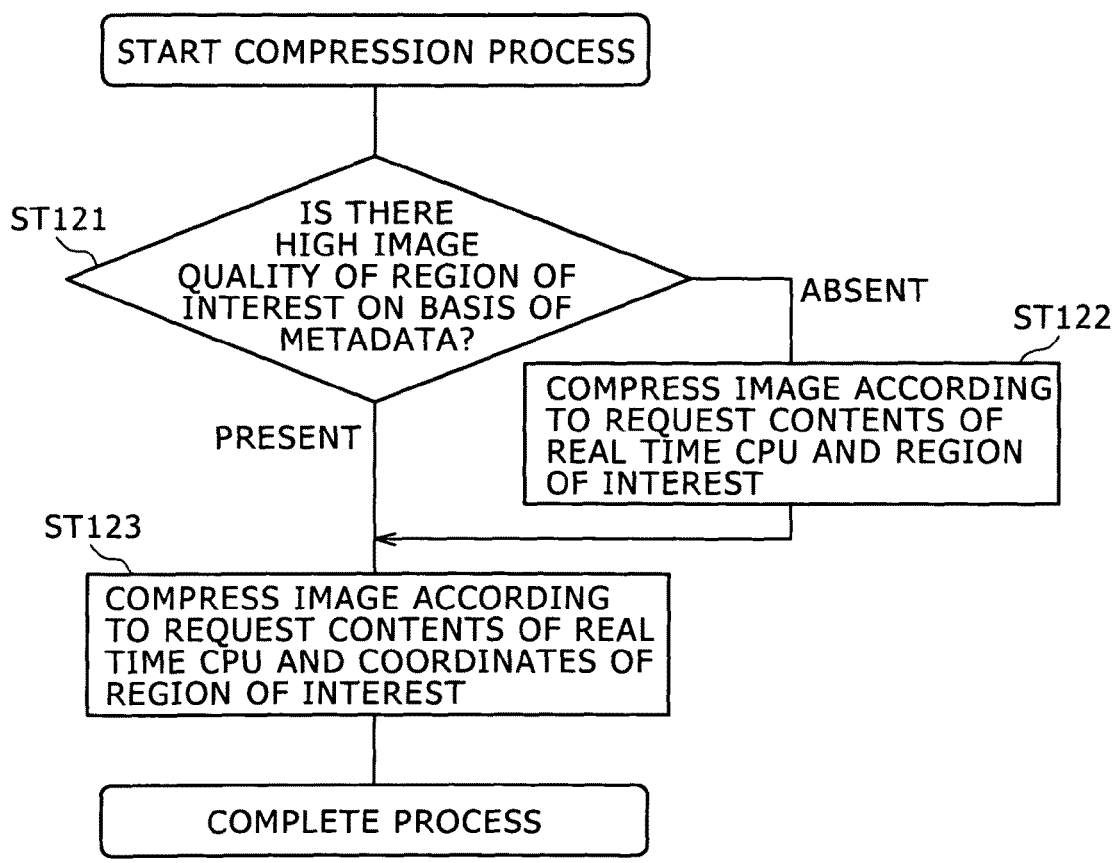

FIG. 21

| |
|---|
| IMAGE ID |
| OUTPUT DESTINATION SETTING (DISPLAY DEVICE/COMPRESSING DEVICE) |
| IMAGE COMPRESSION INFORMATION (WHEN OUTPUT DESTINATION IS OTHER THAN DISPLAY DEVICE) |
| SYNTHESIZER OPERATION SETTING (ON/OFF) |
| NUMBER OF CONVERTERS USED |
| COMPRESSION BIT RATE |
| COMPRESSION FRAME RATE |
| CONVERTER ID |
| OUTPUT PICTURE SIZE SETTING (WIDTH × HEIGHT) |
| DETECTOR OPERATION SETTING (OFF/MOVING OBJECT DETECTION/ NON-MOVING OBJECT DETECTION/FACE DETECTION) |
| DETECTION FRAME DISPLAY SETTING (ON/OFF) |
| DETECTION TIME DISPLAY SETTING (ON/OFF) |
| DETECTION TIME DISPLAY START COORDINATE SETTING (X, Y) |
| IMAGE DISPOSITION COORDINATES (X, Y) AFTER SYNTHESIS |

The last seven rows (CONVERTER ID through IMAGE DISPOSITION COORDINATES (X, Y) AFTER SYNTHESIS) are bracketed as: INFORMATION NOTIFIED PER CONVERTER USED

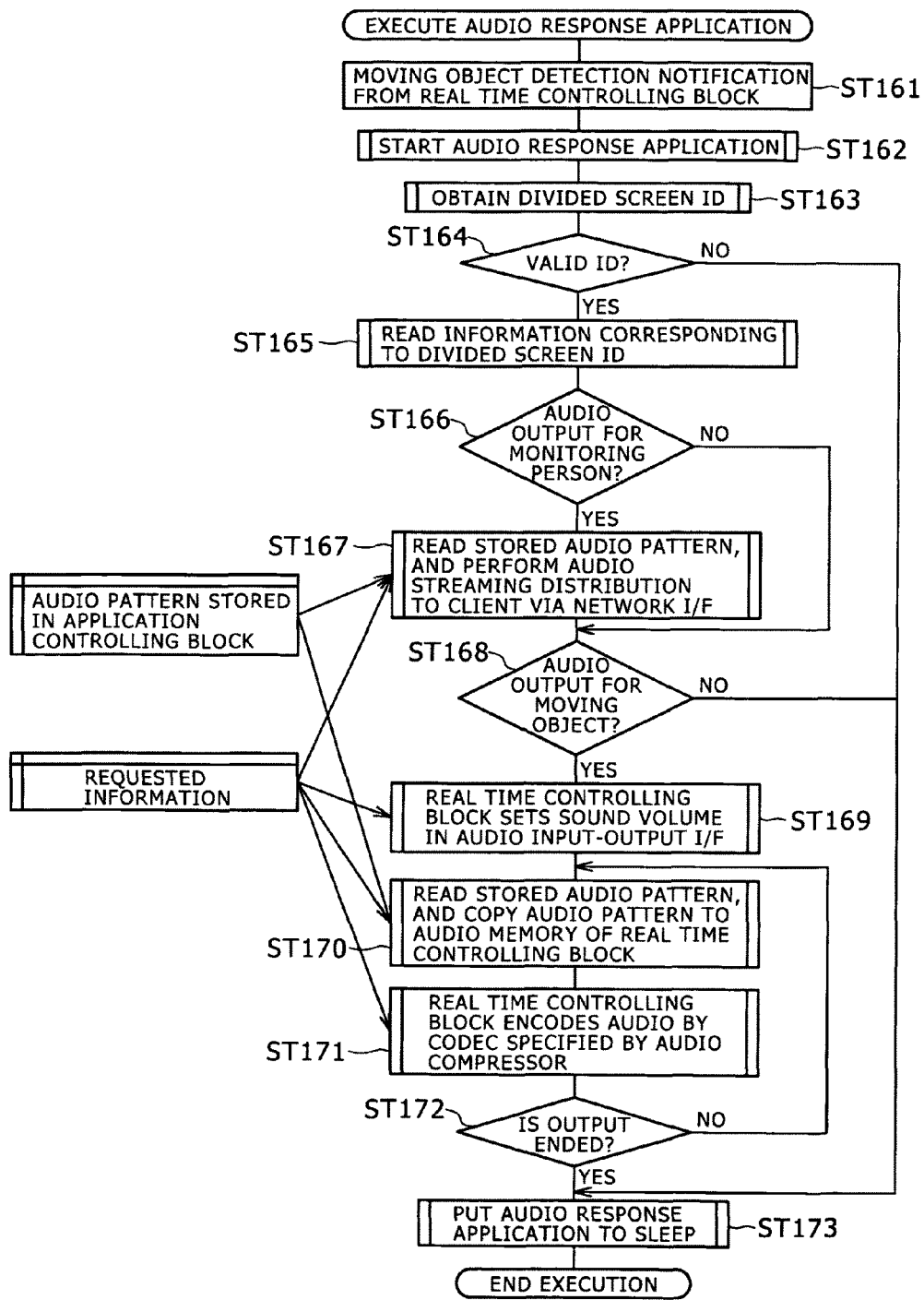

IMAGE PROCESSING DEVICE, IMAGE PROCESSING SYSTEM, CAMERA DEVICE, IMAGE PROCESSING METHOD, AND PROGRAM

BACKGROUND OF THE INVENTION

1. Field of the Invention

The present invention relates to an image processing device, an image processing system, a camera device, an image processing method, and a program for generating a plurality of pieces of image data from an input image including a plurality of objects, for example.

2. Description of the Related Art

A monitoring device has been proposed which can detect a person in motion from image data (monitoring image) of a monitoring area and combine the face of the person photographed best with the monitoring image data (see Japanese Patent Laid-Open No. 2006-217070 (hereinafter referred to as Patent Document 1)).

According to this monitoring device, a magnified face of a person is displayed in a state of being combined with one monitoring image.

SUMMARY OF THE INVENTION

The monitoring device disclosed in Patent Document 1 can display not only a monitoring image within an image pickup area but also the face of a person. The monitoring device is therefore useful when a monitoring object is a person.

However, the monitoring object is not limited to a person in motion, but is often a non-moving object (stationary object) standing still for a certain time, such for example as a suspicious bag left unclaimed or a suspicious car at a stop.

With this monitoring device, the monitoring object is limited to a person, and stationary objects as cited for example cannot be a monitoring object.

In addition, in a monitoring system or the like, an image output froth a monitoring device is once stored in a server, and then image processing such as a detecting process or the like is performed. Therefore a client that receives the image cannot perform real time monitoring.

Because of the necessity of preparing a server as described above, the construction of a monitoring system or the like is troublesome.

The monitoring device or a camera device can distribute only one image for an input image, and is thus unable to play the role of a server responding to requests from a plurality of clients.

The existing monitoring device or camera device can detect only one kind of object for an input image, and is thus unable to meet different requests.

Because of detection of only one kind of object as described above, an environment in which the device is installed is limited.

It is desirable to provide an image processing device, an image processing system, a camera device, an image processing method; and a program that can detect a plurality of objects from an input image irrespective of whether the objects are moving objects or non-moving objects and which can meet different requests.

According to a first embodiment of the present invention, there is provided an image processing device including: a detecting section configured to detect a plurality of objects by type from one input image; a generating section configured to generate image data on each of the objects detected by the detecting section as images of respective different picture frames by types of the objects; and a processing section configured to subject the images of the different picture frames, the images of the different picture frames being generated by the generating section, to processing according to one of a setting and a request.

According to a second embodiment of the present invention, there is provided an image processing system including: a network; an image processing device capable of communication via the network; and at least one communicating device capable of communication with the image processing device via the network; the image processing device includes a detecting section configured to detect a plurality of objects by type from one input image, a generating section configured to generate image data on each of the objects detected by the detecting section as images of respective different picture frames by types of the objects, and a processing section capable of subjecting the images of the different picture frames, the images of the different picture frames being generated by the generating section, to processing according to one of a setting and a request, and outputting a result to the network.

According to a third embodiment of the present invention, there is provided a camera device including: an image pickup section configured to obtain picked-up image data; and an image processing device for subjecting the image data obtained by the image pickup section to image processing; the image processing device includes a detecting section configured to detect a plurality of objects by type from one input image, a generating section configured to generate image data on each of the objects detected by the detecting section as images of respective different picture frames by types of the objects, and a processing section configured to subject the images of the different picture frames, the images of the different picture frames being generated by the generating section, to processing according to one of a setting and a request.

According to a fourth embodiment of the present invention, there is provided an image processing method including: a detecting step of detecting a plurality of objects by type from one input image; a generating step of generating image data on each of the objects detected by the detecting step as images of respective different picture frames by types of the objects; and a processing step of subjecting the images of the different picture frames, the images of the different picture frames being generated by the generating step, to processing according to one of a setting and a request.

According to a fifth embodiment of the present invention, there is provided a program for making a computer perform image processing including: a detecting step of detecting a plurality of objects by type from one input image; a generating step of generating image data on each of the objects detected by the detecting step as images of respective different picture frames by types of the objects; and a processing step of subjecting the images of the different picture frames, the images of the different picture frames being generated by the generating step, to processing according to one of a setting and a request.

According to the present embodiment, a detecting section detects a plurality of objects by type from one piece of input image data.

Then, a generating section generates image data on each of the objects detected by the detecting section by types of the objects.

Then, a processing section subjects the images of the different picture frames, the images of the different picture frames being generated by the generating section, to processing according to one of a setting and a request.

According to the present embodiment, it is possible to detect a plurality of objects from an input image irrespective of whether the objects are moving objects or non-moving objects, and meet different requests.

BRIEF DESCRIPTION OF THE DRAWINGS

FIG. 12 is a diagram showing an example of general configuration of an image processing system according to a second embodiment of the present invention;

FIGS. 13A, 13B, 13C, 13D, and 13E are diagrams showing images transmitted to clients after a camera device according to the second embodiment performs predetermined processing on a camera input image;

FIG. 20 is a diagram showing a process flow of an image compressor according to the second embodiment;

FIG. 21 is a diagram showing an example of image processing information notified from an application control processing section according to the second embodiment;

FIG. 27 is a flowchart of assistance in explaining an executing process of the application in the second embodiment.

DETAILED DESCRIPTION OF THE PREFERRED EMBODIMENTS

Preferred embodiments of the present invention will hereinafter be described with reference to the drawings.

Incidentally, description will be made in the following order.

1. First Embodiment (First Example of Configuration of Image Processing System)

2. Second Embodiment (Second Example of Configuration of Image Processing System)

1. First Embodiment

First Example of Configuration of Image Processing System

An example of configuration of a basic image processing system will first be described with reference to FIGS. 1 to 3 by taking a monitoring image processing system as an example.

Figure 1:
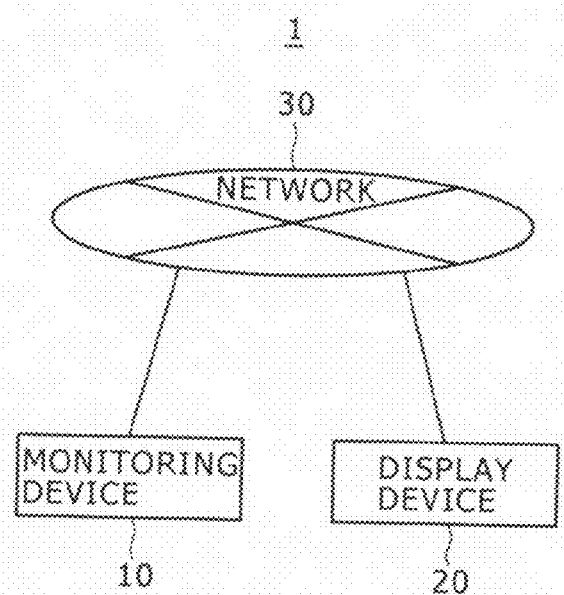
FIG. 1 is a diagram showing an example of general configuration of a monitoring image processing system according to a first embodiment of the present invention.

FIG. 1 is a diagram showing an example of general configuration of a basic monitoring image processing system according to an embodiment of the present invention.

As shown in FIG. 1, the monitoring image processing system 1 includes a monitoring device 10, a display device 20, and a network 30.

The monitoring device 10 is for example formed by a monitoring camera device or the like. The monitoring device 10 is connected to the display device 20 via the network 30 such as a LAN (Local Area Network) or the like. The display device 20 is formed by a liquid crystal display (LCD) or the like.

When photographing a monitoring object, the monitoring device 10 automatically detects a moving object, a non-moving object (stationary object), and the face of a person, and generates a monitoring image to be displayed on the display device 20. The monitoring device 10 then outputs the monitoring image data to the display device 20 via the network 30.

Then, the monitoring image input from the monitoring device 10 is displayed on the display device 20. A monitoring person can therefore view the monitoring image of the monitoring device 10 using the display device 20 even at a place distant from the monitoring device 10.

The monitoring object of the monitoring device 10 will be described in the following with reference to FIG. 2.

Figure 2:
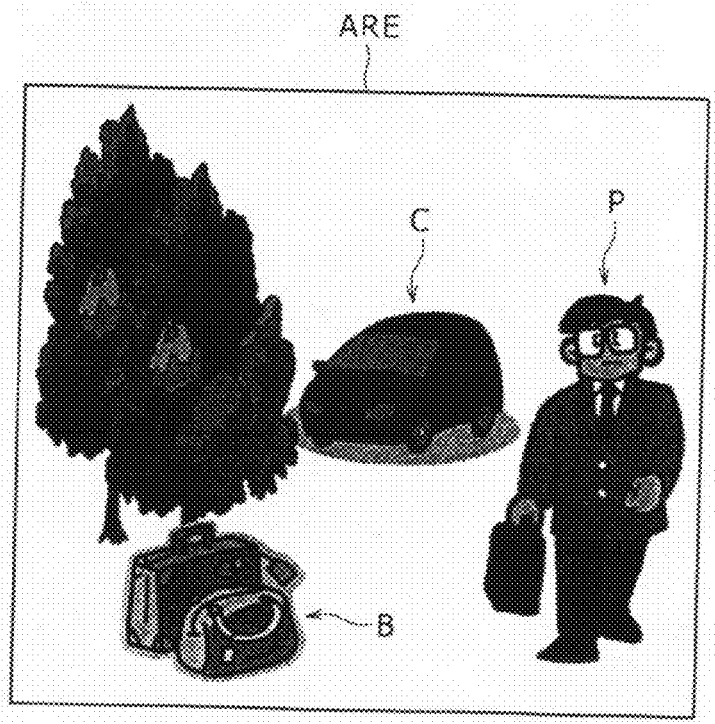
FIG. 2 is a schematic diagram of assistance in explaining monitoring objects of a monitoring device according to the first embodiment of the present invention.

FIG. 2 is a schematic diagram of assistance in explaining the monitoring object of the monitoring device according to a first embodiment of the present invention. FIG. 2 illustrates a plurality of monitoring objects in a monitoring area ARE of the monitoring device 10.

The monitoring device 10 has a moving object, a non-moving object (stationary object), and the face of a person as a monitoring object in the monitoring area ARE.

As shown in FIG. 2, a moving object is a person or a thing in motion, such as a person P who is walking or a car that is running (not shown), for example.

On the other hand, a non-moving object (stationary object) is a thing or a person that is stationary for a certain time, such as a bag B left on a street, a car C at a stop, or a person standing still (not shown), for example.

The above-described monitoring image data is moving image data formed by a plurality of frames (images). MPEG4 (Moving Picture Expert Group 4) or H.264/AVC (Advanced Video Coding), for example, is suitably used as a moving image format.

Figure 3:
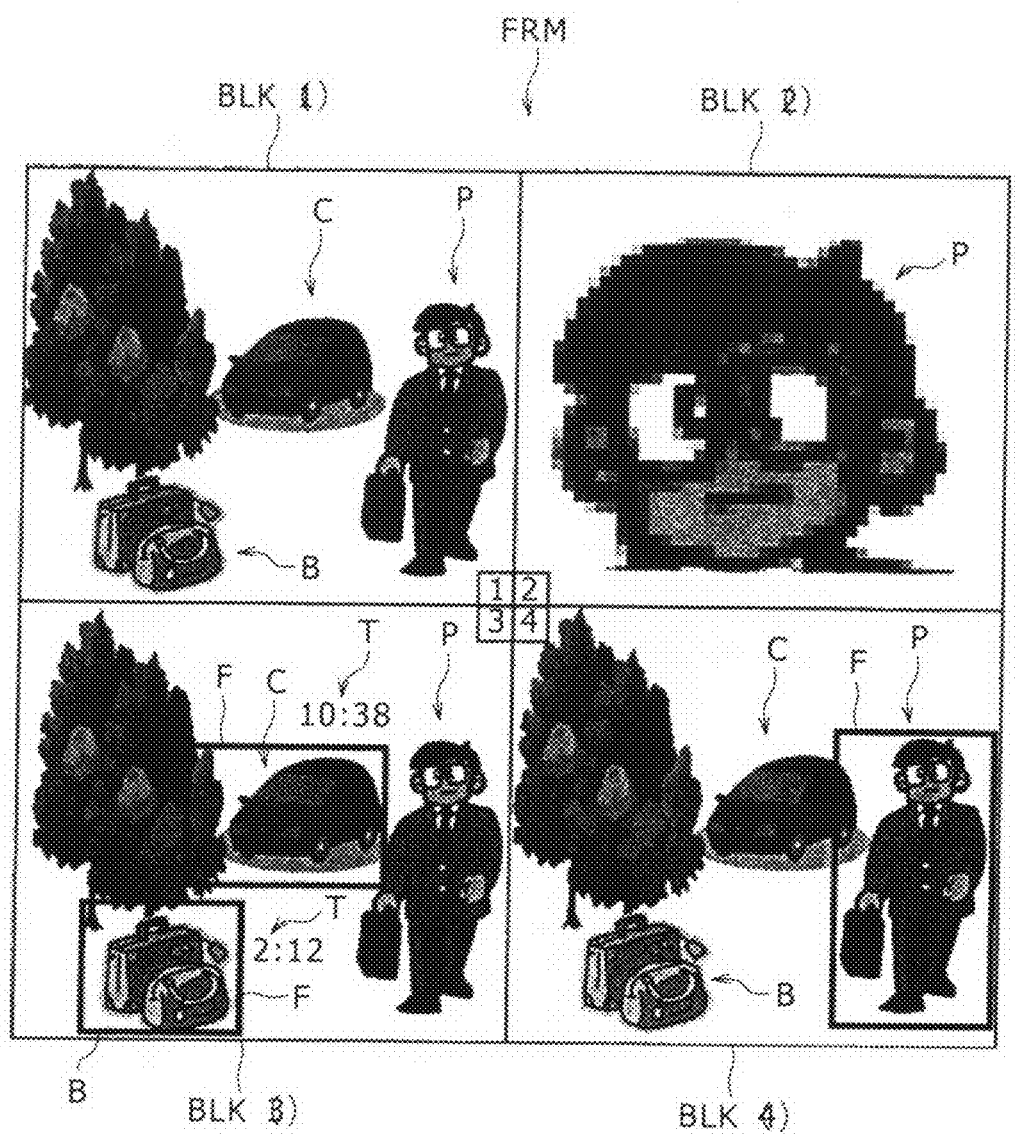
FIG. 3 is a schematic diagram showing an example of generated images generated by the monitoring device according to the first embodiment of the present invention.

FIG. 3 is a schematic diagram showing an example of a generated image generated by the monitoring device according to the first embodiment of the present invention.

FIG. 3 illustrates one frame FRM of the monitoring image data. As shown in FIG. 3, an image within the frame FRM is divided into four blocks BLK(1) to BLK(4).

The block BLK(1) displays the photographed image of the monitoring area ARE photographed by the monitoring device 10 as it is. The image of the block BLK(1) will hereinafter be referred to simply as the photographed image.

The block BLK(2) next to the block BLK(1) on a right side displays an enlarged face of the person P.

The block BLK(3) on a lower side displays frames of a rectangular shape (hereinafter referred to as rectangular frames) F as an informing image so as to enclose the images of the bag B and the car C. The rectangular frames F are to inform that the bag B and the car C are monitoring objects.

In addition, a non-moving time (stationary time) T such as "2:12" or "10:38," for example, is displayed in the vicinity of each of the rectangular frames F. The non-moving time (stationary time) T is for example an elapsed time from a time at which the bag B or the car C became stationary.

The block BLK(4) displays a rectangular frame F so as to enclose the image of the person P.

Thus, the monitoring device 10 detects a moving object, a stationary object, and the face of a person by type from one piece of image pickup data. The monitoring device 10 then generates monitoring image data representing four different images as one monitoring image.

Of course, monitoring objects can be suitably set in advance. For example, it is possible to set only a non-moving object (stationary object) as a monitoring object, or set only the face of a person as a monitoring object.

As shown in FIG. 3, the four blocks BLK(1) to BLK(4) have equal display areas. However, it is possible to make the display area of the block BLK(1) a largest display area, for example.

The rectangular frame F is to make the monitoring object clear. Therefore the shape of the rectangular frame F may be an oval shape, for example. For example, the rectangular frame F itself may be blinked, or the rectangular frame F may be an image of a mark or the like.

Suppose in the following that the monitoring objects are one person P, one bag B, and one car C. In addition, suppose that the person P is a moving object and that the bag B and the car C are stationary objects.

[Example of Configuration of Monitoring Device]

An example of configuration of the monitoring device 10 will be described.

Figure 4:
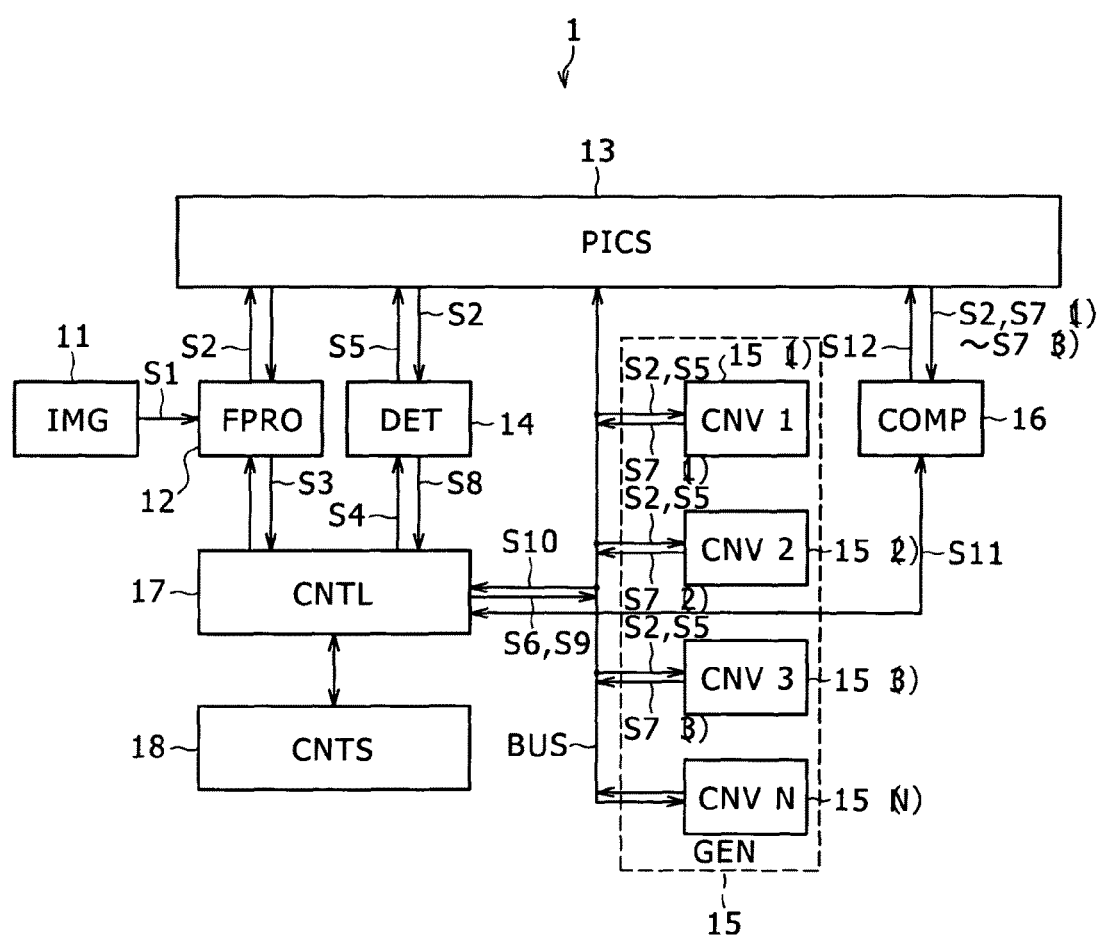
FIG. 4 is a schematic block diagram showing an example of configuration of the monitoring device according to the first embodiment of the present invention.

FIG. 4 is a schematic block diagram showing an example of configuration of the monitoring device according to the first embodiment of the present invention.

The monitoring device 10 has an image pickup section (IMG) 11, a preprocessing section (FPRO) 12, an image memory (PICS) 13, a detecting section (DET) 14, a generating section (GEN) 15, a synthesizing section (COMP) 16, a control processing section (CNTL) 17, and a control memory (CNTS) 18.

Incidentally, the preprocessing section 12, the image memory 13, the detecting section 14, the generating section 15, the synthesizing section 16, the control processing section 17, and the control memory 18 form an image processing device.

The synthesizing section 16, the control processing section 17, and the control memory 18 form a processing unit.

As shown in FIG. 4, the image pickup section 11 includes for example an optical system and a CMOS (Complementary Metal Oxide Semiconductor) image sensor as a solid-state image pickup element. Incidentally, a CCD (Charge Coupled Device) or the like can be employed as the solid-state image pickup element in place of the CMOS image sensor.

The image pickup section 11 photographs the monitoring area ARE, and outputs a resulting picture as image pickup data S1 to the preprocessing section 12.

The preprocessing section 12 subjects the image pickup data S1 input from the image pickup section 11 to image processing. This image processing is for example gamma correction, white balance processing, and color interpolation. Then, the preprocessing section 12 stores photographed image data S2 resulting from the image processing in the image memory 13.

Incidentally, the photographed image data S2 is the data of a photographed image to be displayed in the block BLK(1) shown in FIG. 3.

The preprocessing section 12 thereafter outputs an image processing end signal S3 indicating that the image processing has ended to the control processing section 17.

The image memory 13 is for example formed by a storage device allowing random access. The image memory 13 is accessed by the preprocessing section 12, the detecting section 14, the generating section 15, and the synthesizing section 16 under control of the control processing section 17.

The image memory 13 stores data output by the preprocessing section 12, the detecting section 14, the generating section 15, and the synthesizing section 16.

The detecting section 14 performs the following detecting process when receiving a detecting process start signal S4 to an effect that the detecting process is to be started from the control processing section 17.

Specifically, the detecting section 14 reads the photographed image data S2 resulting from the image processing by the preprocessing section 12 from the image memory 13. The detecting section 14 then performs a moving object detecting process, a non-moving object (stationary object) detecting process, and a face detecting process on the basis of the photographed image data. S2.

The moving object detecting process detects a moving object from the photographed image data S2. The non-moving object (stationary object) detecting process detects a stationary object from the photographed image data S2. The face detecting process detects the face of a person from the photographed image data S2.

In the present embodiment, the person P is detected by the moving object detecting process, and the bag B and the car C are detected by the non-moving object (stationary object) detecting process. Further, the face of the person P is detected by the face detecting process.

The detecting section 14 then generates monitoring object data S5 on the basis of a result of these detecting processes, and stores the monitoring object data S5 in the image memory 13. At this time, the detecting section 14 stores the monitoring object data S5 at a specified address in the image memory 13 according to an instruction of the control processing section 17.

The detecting section 14 thereafter outputs a detecting process end signal S8 to an effect that the detecting process has ended to the control processing section 17.

[Details of Monitoring Object Data S5]

The monitoring object data S5 will be described in the following with reference to FIGS. 5 to 7.

Figure 5:
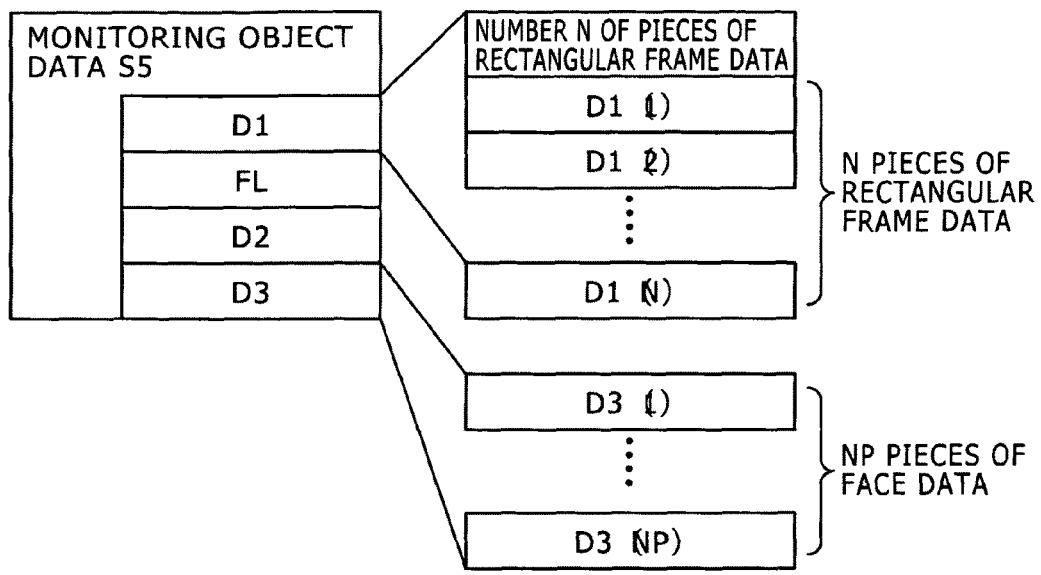
FIG. 5 is a diagram showing an example of configuration of monitoring object data according to the first embodiment of the present invention.

FIG. 5 is a diagram showing an example of configuration of monitoring object data according to the first embodiment of the present invention.

As shown in FIG. 5, the monitoring object data S5 includes rectangular-frame data D1, a flag FL, additional data D2, and face data D3. However, suppose that the monitoring object data S5 is data for one frame.

[Rectangular Frame Data D1]

The rectangular frame data D1 will be described.

The rectangular frame data D1 is data on the rectangular frames F added so as to enclose the images of the person P, the bag B, and the car C as monitoring objects.

Specifically, the rectangular frame data D1 is formed by pieces of rectangular frame data D1(1) to D1(N) equal in number to that (N) of the monitoring objects detected by the detecting section 14.

In the present embodiment, because the detecting section 14 detects one person P, one bag B, and one car C, the rectangular frame data D1 is formed by three pieces of rectangular frame data D1(1) to D1(3).

If the detecting section 14 detects NP persons P, NB bags B, and NC cars C, the rectangular frame data D1 is formed by N=(NB+NC+NP) pieces of rectangular frame data D1(1) to D1(N). Incidentally, N, NB, NC, and NP are each a positive integer.

Suppose that in the following description, the pieces of rectangular frame data D1(1) to D1(3) are data related to the person P, the bag B, and the car C, respectively.

The pieces of rectangular frame data D1(1) to D1(N) will be described.

Figure 6:
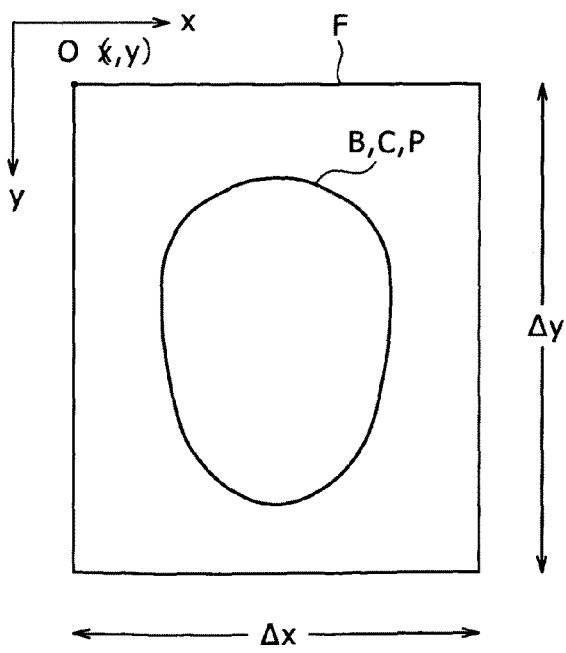
FIG. 6 is a schematic diagram showing an example of a rectangular frame according to the first embodiment of the present invention.

FIG. 6 is a schematic diagram showing an example of a rectangular frame according to the first embodiment of the present invention.

Figure 7:
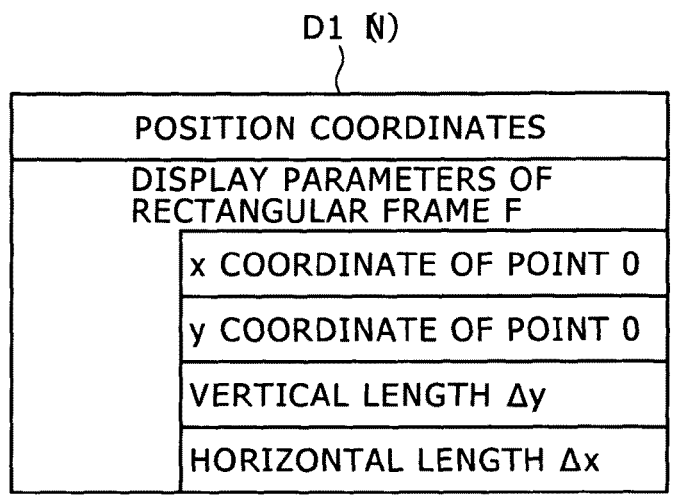
FIG. 7 is a diagram showing a detailed example of rectangular frame data according to the first embodiment of the present invention.

FIG. 7 is a diagram showing a detailed example of rectangular frame data according to the first embodiment of the present invention.

As shown in FIG. 6, a rectangular frame F is added so as to enclose the image of each monitoring object (B, C, P). To add the rectangular frame F to the periphery of the image of the monitoring object needs position coordinates on the image of each monitoring object and display parameters of the rectangular frame F. Coordinates of an outline of the monitoring object, for example, are used as position coordinates of the monitoring object.

Thus, as shown in FIG. 7, the pieces of rectangular frame data D1(1) to D1(N) are formed by the position coordinates of the respective monitoring objects and display parameters of the rectangular frames F. The display parameters of the rectangular frames F include the x coordinate of point O, the y coordinate of point O, a vertical (y-axis direction) length Δy, and a horizontal (x-axis direction) length Δx.

For example, as shown in FIG. 3, a rectangular frame F is added to the periphery of the image of the person P on the basis of the position coordinates of the person P.

[Flag µL]

The flag FL will be described. The flag FL is to identify the monitoring object as one of a moving object, a non-moving object (stationary object), and the face of a person. The flag FL is associated with each monitoring object, that is, each of the pieces of rectangular frame data D1(1) to D1(N).

Specifically, when the monitoring object is a moving object, a moving object flag FL1 is associated with the corresponding rectangular frame data D1(N). This moving object flag FL1 indicates that the monitoring object is a moving object.

When the monitoring object is a stationary object, a stationary object flag FL2 is associated with the corresponding rectangular frame data D1(N). This stationary object flag FL2 indicates that the monitoring object is a stationary object.

When the monitoring object is the face of a person, a face flag FL3 is associated with the corresponding rectangular frame data D1(N). This face flag FL3 indicates that the monitoring object is the face of a person.

[Additional Data D2]

The additional data D2 is data on a stationary time T added to the periphery of the image of each stationary object. In the present embodiment, the stationary time T is added to the vicinity of each rectangular frame F displayed in the block BLK(3).

Thus, the additional data D2 is associated with the rectangular frame data D1(N) associated with a stationary object flag FL2.

[Face Data D3]

The face data D3 is used when the face of the person P is displayed in an enlarged state or a reduced state. The face data D3 is data on position coordinates of the faces of NP persons when monitoring objects include the NP persons.

Therefore the face data D3 is formed by NP pieces of face data D3(1) to D3(NP). In the present embodiment, the face data D3 is formed by face data D3(1) on the face of one person P.

[Detailed Example of Configuration of Detecting Section 14]

The detailed configuration of the detecting section 14 will be described with reference to FIG. 8.

Figure 8:
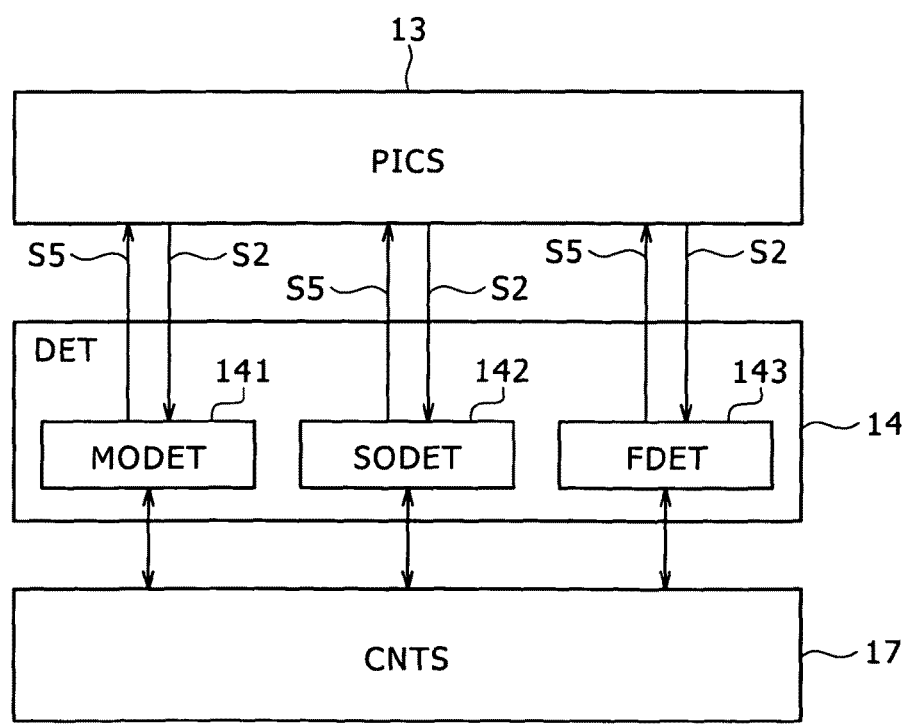
FIG. 8 is a block diagram showing an example of detailed configuration of a detecting section according to the first embodiment of the present invention.

FIG. 8 is a block diagram showing a detailed example of configuration of the detecting section according to an embodiment of the present invention.

The monitoring device 10 monitors three kinds of monitoring objects, that is, a moving object, a non-moving object (stationary object), and the face of a person. The detecting section 14 has three kinds of detectors to detect monitoring objects by type.

Specifically, the detecting section 14 has a moving object detector (MODET) 141, a non-moving object (stationary object) detector (SODET) 142, and a face detector (FDET) 143.

[Details of Moving Object Detector 141]

The moving object detector 141 will be described.

The moving object detector 141 for example performs a moving object detecting process that detects a moving object from the photographed image data S2 stored in the image memory 13 using a background difference method.

In the present embodiment, one person P is detected. In addition to the background difference method, an inter-frame difference method, an optical flow method or the like can be suitably used for the moving object detecting process.

The moving object detector 141 then generates a part of the monitoring object data S5 on the basis of a result of the detecting process. Specifically, the moving object detector 141 generates rectangular frame data D1(1) on the person P and a moving object flag FL1, and associates the moving object flag FL1 with the rectangular frame data D1(1).

Incidentally, in the present embodiment, because a stationary time T is not added to the moving object, the moving object detector 141 does not generate additional data D2.

[Details of Non-Moving Object (Stationary Object) Detector 142]

The non-moving object (stationary object) detector 142 will be described.

The non-moving object detector 142 performs a non-moving object (stationary object) detecting process that detects a non-moving object (stationary object) from the photographed image data S2 stored in the image memory 13.

At this time, the non-moving object detector 142 determines that an object in an area where no difference is detected between an (n−1)th frame FRM and an nth frame FRM is a non-moving object (stationary object), for example. In the present embodiment, the bag B and the car C are detected.

The non-moving object detector 142 then generates a part of the monitoring object data S5 on the basis of a result of the detection. Specifically, the non-moving object detector 142 generates rectangular frame data D1(2) on the bag B, rectangular frame data D1(3) on the car C, and a stationary object flag FL2. At this time, the non-moving object detector 142 associates the stationary object flag FL2 with each of the pieces of rectangular frame data D1(2) and D1(3).

Further, when non-moving objects (stationary objects) are detected, the non-moving object detector 142 measures a time from a point in time of the detection for each non-moving object (stationary object) to display a stationary time T in the vicinity of an image of the non-moving object (stationary object). The time is measured by a timer not shown in the figure, for example.

The non-moving object detector 142 then generates additional data D2 on the basis of the measured time, and associates the additional data D2 with each of the pieces of rectangular frame data D1(2) and D1(3).

[Details of Face Detector 143]

The face detector 143 performs a face detecting process that detects the face of a person P. For example, a method of detecting an area corresponding to a flesh color from the photographed image data S2 and determining that the area is a face is used for the face detecting process.

The face detector 143 then generates a part of the monitoring object data S5 on the basis of a result of the detection. Specifically, the face detector 143 generates face data D3(1) on the face of the person P and a face flag FL3. At this time, the face detector 143 associates the face flag FL3 with the face data D3(1).

[Details of Generating Section 15]

The generating section 15 generates the image data of the respective blocks BLK(2) to BLK(4) shown in FIG. 3 on the basis of the photographed image data S2 resulting from image processing by the preprocessing section 12.

The generating section 15 has a function of enlarging or reducing the face of the person P, for example, according to a setting condition and instruction information at the time of the image generation.

The generating section 15 also performs an adding process for the generated image.

This adding process adds the monitoring object data S5 including the rectangular frames F, the stationary times T and the like to the photographed image data S2. At the time of the adding process, the generating section 15 enlarges or reduces the face of the person P.

The generating section 15 has N converters (CNV) 15(1) to 15(N) to perform a process corresponding to each of the detectors forming the detecting section 14. Each of the converters 15(1) to 15(N) is connected to the control processing section 17 and the image memory 13 by a bus BUS.

The number N of converters is the number of detectors forming the detecting section 14.

In the present embodiment, the detecting section 14 is formed by the moving object detector 141, the non-moving object (stationary object) detector 142, and the face detector 143, and therefore the generating section 15 is formed by three converters 15(1) to 15(3).

Description in the following will be made supposing that the generating section 15 is formed by the three converters 15(1) to 15(3).

The converters 15(1) to 15(3) are assigned processing contents at a time of an initializing process. At this time, the converters 15(1) to 15(3) receive a control signal S6 from the control processing section 17. Incidentally, the control signal S6 indicates the number of detectors forming the detecting section 14.

The converters 15(1) to 15(3) are respectively associated with the moving object detector 141, the non-moving object (stationary object) detector 142, and the face detector 143 by the control signal S6.

[Details of Converter 15(1)]

The associated converters 15(1) to 15(3) will be described in the following.

The converter 15(1) is assigned a process of generating the image data of the block BLK(4) on the basis of a result of detection of the moving object detector 141. The converter 15(1) adds a rectangular frame F to the periphery of the image of the person P.

Specifically, when an adding process start signal S9 is input from the control processing section 17 to the converter 15(1), the converter 15(1) reads the photographed image data S2 and the monitoring object data S5 stored in the image memory 13. Incidentally, the photographed image data S2 is the photographed image displayed in the block BLK(1).

At this time, the converter 15(1) obtains the rectangular frame data D1 associated with the moving object flag FL1 from the monitoring object data S5. Incidentally, the rectangular frame data D1 is the rectangular frame data D1(1) on the person P.

The converter 15(1) then adds the rectangular frame data D1 to the photographed image data S2. At this time, the converter 15(1) adds a rectangular frame F to the periphery of the image of the person P referring to the position coordinates of the person P and the display parameters of the rectangular frame F, the position coordinates of the person P and the display parameters of the rectangular frame F being included in the rectangular frame data D1(1).

The converter 15(1) thereafter outputs data resulting from the adding process as image data S7(1) of the block BLK(4) to the image memory 13.

[Details of Converter 15(2)]

The converter 15(2) is assigned a process of generating the image data of the block BLK(3) on the basis of a result of detection of the non-moving object (stationary object) detector 142. The converter 15(2) adds a rectangular frame F to the peripheries of the images of the bag B and the car C.

Specifically, when the adding process start signal S9 is input from the control processing section 17 to the converter 15(2), the converter 15(2) reads the photographed image data S2 and the monitoring object data S5 stored in the image memory 13.

At this time, the converter 15(2) obtains the rectangular frame data D1 associated with the stationary object flag FL2 from the monitoring object data S5. Incidentally, the rectangular frame data D1 is the rectangular frame data D1(2) on the bag B and the rectangular frame data D1(3) on the car C.

The converter 15(2) further obtains the additional data D2 on stationary times T.

The converter 15(2) then adds the rectangular frame data D1 and the additional data D2 to the photographed image data S2. At this time, the converter 15(2) adds a rectangular frame F to the periphery of the image of the bag B referring to the position coordinates of the bag B and the display parameters of the rectangular frame F, the position coordinates of the bag B and the display parameters of the rectangular frame F being included in the rectangular frame data D1(2).

The converter 15(2) further adds a stationary time T to the vicinity of the rectangular frame F. Incidentally, a position at which to add the stationary time T is desirably a position at which the stationary time T can be easily recognized as the elapsed time of the monitoring object.

Also for the car C, the converter 15(2) similarly adds the rectangular frame data D1 and the additional data D2 to the photographed image data S2.

The converter 15(2) thereafter outputs data resulting from the adding process as image data S7(2) of the block BLK(3) to the image memory 13.

[Details of Converter 15(3)]

The converter 15(3) is assigned a process of generating the image data of the block BLK(2) on the basis of a result of detection of the face detector 143. The converter 15(3) enlarges or reduces the face of the person P.

Specifically, when the adding process start signal S9 is input from the control processing section 17 to the converter 15(3), the converter 15(3) reads the photographed image data S2 and the monitoring object data S5 stored in the image memory 13.

At this time, the converter 15(3) obtains the face data D3 associated with the face flag FL3 from the monitoring object data S5. Incidentally, the face data D3 is the face data D3(1) on the face of the person P.

The converter 15(3) then enlarges or reduces the image of the face such that the face of the person P occupies most of the area of the block BLK(2).

The converter 15(3) thereafter outputs the enlarged or reduced image as image data S7(3) of the block BLK(2) to the image memory 13.

The synthesizing section 16 performs a synthesizing process for generating monitoring image data to be displayed on the display device 20.

Specifically, when a synthesizing process start signal S11 is input from the control processing section 17 to the synthesizing section 16, the synthesizing section 16 reads each of the pieces of image data S7(1) to S7(3) generated by the converters 15(1) to 15(3) and the photographed image data S2 from the image memory 13. The synthesizing section 16 then generates one piece of monitoring image data S12 by synthesizing these pieces of data.

Thereby a monitoring image as shown in FIG. 3 is generated. The monitoring image data S12 is once stored in the image memory 13, and thereafter output to the display device 20 (see FIG. 1).

The control processing section 17 is formed by a CPU (Central Processing Unit), a DSP (Digital Signal Processor) or the like. The control processing section 17 controls the whole of the monitoring device 10.

Specifically, the control processing section 17 outputs the detecting process start signal S4, the control signal S6, the adding process start signal S9, the synthesizing process start signal S11 and the like, and controls the image pickup section 11, the preprocessing section 12, the image memory 13, the detecting section 14, the generating section 15, the synthesizing section 16, and the control memory 18.

The control memory 18 is formed by a storage device allowing random access. The control memory 18 is accessed by the control processing section 17. The control memory 18 stores for example an application program necessary for the operation of the control processing section 17, an operating system, and temporary data.

[Example of Operation of Monitoring Device 10]

An overview of operation of the monitoring device 10 will be described with reference to FIG. 9.

Figure 9:
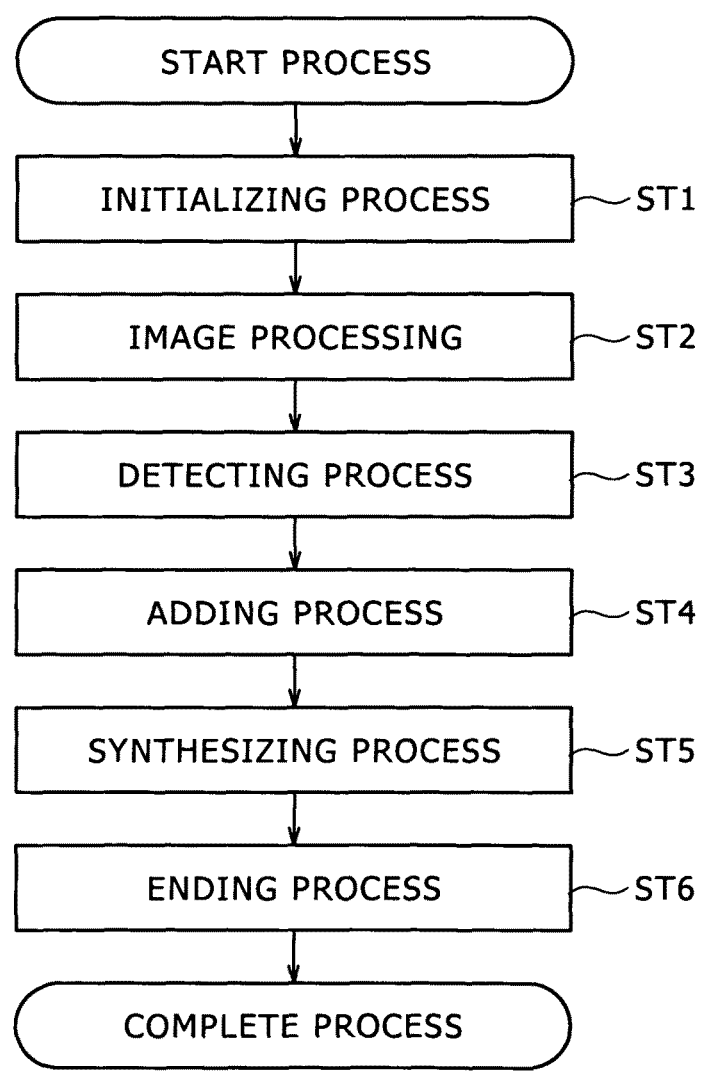
FIG. 9 is a flowchart of an example of operation of the monitoring device according to the first embodiment of the present invention.

FIG. 9 is a flowchart of an example of operation of the monitoring device according to the first embodiment of the present invention.

Description in the following will be made by taking a process for one arbitrary frame as an example.

As shown in FIG. 9, an initializing process is performed first (ST1). Specifically, the control processing section 17 outputs the number of detectors forming the detecting section 14 as a control signal S6 to the synthesizing section 16.

The control processing section 17 then associates the converters 15(1) to 15(3) with the moving object detector 141, the non-moving object detector 142, and the face detector 143 on the basis of the control signal S6.

After an end of the initializing process, the image pickup section 11 photographs monitoring objects in the monitoring area ARE, and outputs the result as image pickup data S1 to the preprocessing section 12.

Thereafter image processing is performed (ST2). Specifically, the preprocessing section 12 subjects the image pickup data S1 input from the image pickup section 11 to image processing. Then, the preprocessing section 12 stores image data resulting from the image processing in the image memory 13, and outputs an image processing end signal S3 indicating that the image processing has ended to the control processing section 17.

After the end of the image processing, a detecting process is performed (ST3). Specifically, when the image processing end signal S3 is input from the preprocessing section 12 to the control processing section 17, the control processing section 17 outputs a detecting process start signal S4 to an effect that the detecting process is to be started to the detecting section 14.

When the detecting process start signal S4 is input from the control processing section 17 to the detecting section 14, the detecting section 14 reads the photographed image data S2 resulting from the image processing by the preprocessing section 12 from the image memory 13.

The detecting section 14 then performs a moving object detecting process, a non-moving object (stationary object) detecting process, and a face detecting process on the basis of the photographed image data S2.

The detecting section 14 thereafter generates monitoring object data S5 including rectangular frame data D1, a flag FL, additional data D2, and face data D3, and outputs the monitoring object data S5 to the image memory 13. The detecting section 14 then outputs a detecting process end signal S8 to the control processing section 17.

After an end of the detecting process, an adding process is performed (ST4).

Specifically, when the control processing section 17 receives the detecting process end signal S8 from the detecting section 14, the control processing section 17 outputs an adding process start signal S9 to an effect that an adding process is to be started to the generating section 15.

When the adding process start signal S9 is input from the control processing section 17, the converters 15(1) to 15(3)

generate the image data of the blocks BLK(2) to BLK(4), respectively. The converters 15(1) to 15(3) then output image data S7(1) to S7(3) resulting from the adding process to the image memory 13.

After an end of the adding process, a synthesizing process is performed (ST5). Specifically, when an adding process end signal S10 is input from the generating section 15 to the control processing section 17, the control processing section 17 outputs a synthesizing process start signal S11 to an effect that the synthesizing process is to be started to the synthesizing section 16.

When the synthesizing process start signal S11 is input from the control processing section 17 to the synthesizing section 16, the synthesizing section 16 reads the image data S7(1) to S7(3) generated by the converters 15(1) to 15(3) and the photographed image data S2 from the image memory 13. The synthesizing section 16 then generates one piece of monitoring image data S12 by synthesizing these pieces of data.

After an end of the synthesizing process, an ending process is performed (ST6). The monitoring image data S12 generated by the synthesizing process is once stored in the image memory 13, and thereafter output to the display device 20 via the network 30.

[Example of Operation of Non-Moving Object (Stationary Object) Detector in Detecting Process]

An example of operation of the non-moving object (stationary object) detector in the detecting process will be described with reference to FIG. 10.

Figure 10:
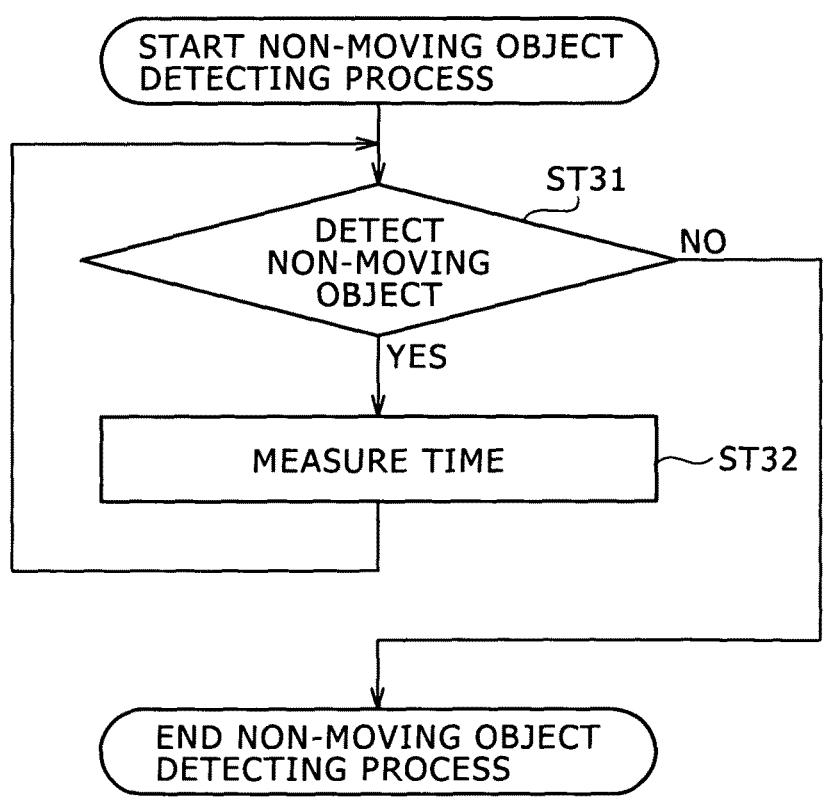
FIG. 10 is a flowchart of assistance in explaining in detail a non-moving object (stationary object) detecting process in a detecting process shown in FIG. 9.

FIG. 10 is a flowchart of assistance in explaining in detail a non-moving object (stationary object) detecting process in the detecting process (ST3) shown in FIG. 9.

As shown in FIG. 10, the non-moving object (stationary object) detector 142 detects a non-moving object (stationary object) from the photographed image data S2 (ST31).

When detecting a non-moving object (stationary object) (YES of ST31), the non-moving object (stationary object) detector 142 measures a time from a point in time of the detection (ST32). Thereafter, the process of step ST31 is resumed, and the time is measured as long as the non-moving object (stationary object) is detected.

On the other hand, when the non-moving object detector 142 does not detect a non-moving object (stationary object) (NO of step ST31), the non-moving object detector 142 ends the non-moving object (stationary object) detecting process.

Alternatively, when a non-moving object (stationary object) is detected in step ST31, but the non-moving object (stationary object) has moved (NO of step ST31), the non-moving object detector 142 also ends the non-moving object (stationary object) detecting process.

[Example of Operation of Control Processing Section 17 in Adding Process]

An example of operation of the control processing section 17 in the adding process will be described with reference to FIG. 11.

Figure 11:
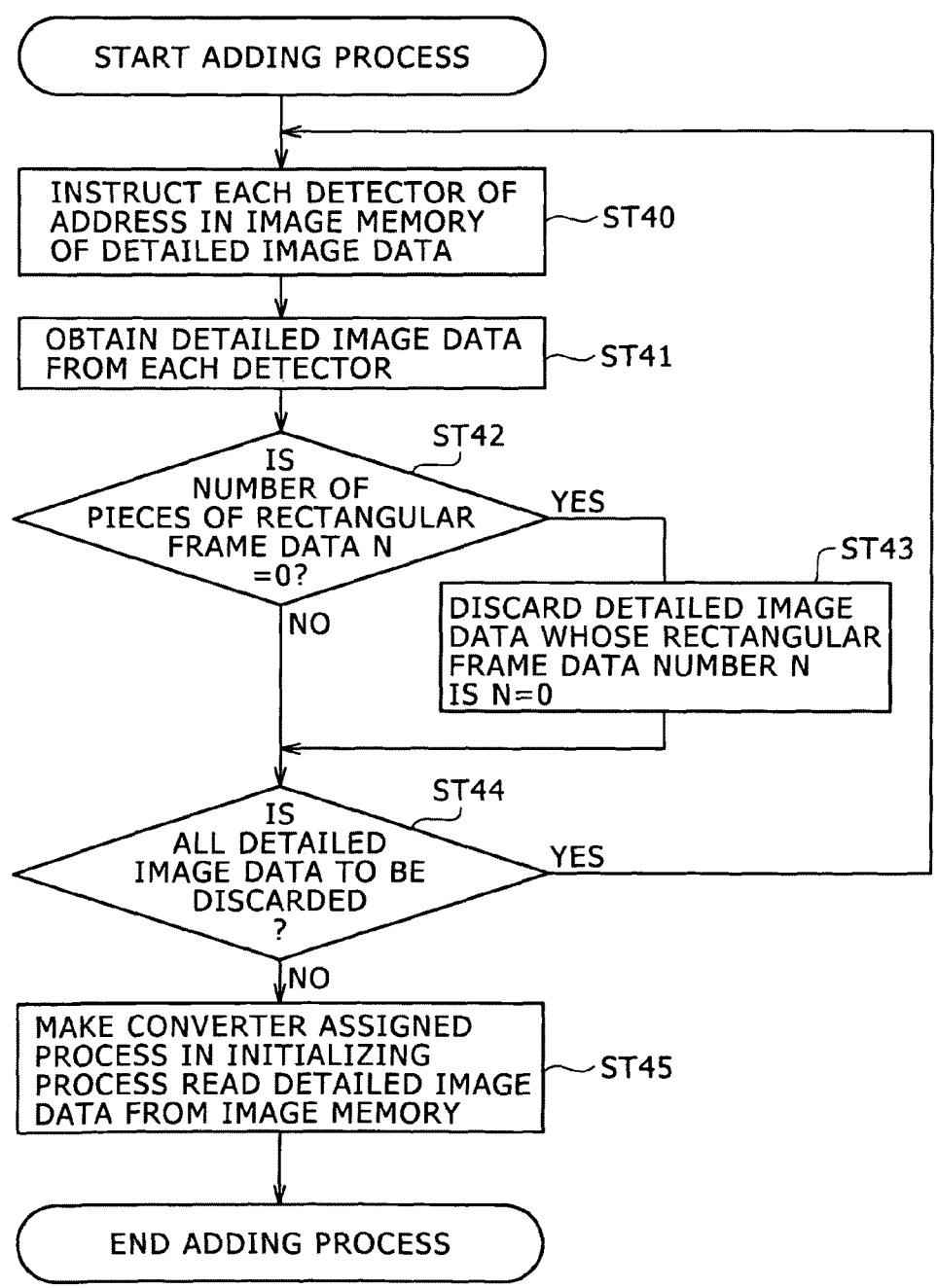
FIG. 11 is a flowchart of assistance in explaining an example of operation of a control processing section in an adding process shown in FIG. 9.

FIG. 11 is a flowchart of assistance in explaining an example of operation of the controlling section in the adding process (ST4) shown in FIG. 9.

When the monitoring object data S5 does not include rectangular frame data D1 of a rectangular frame F to be added, the rectangular frame data D1 does not need to be added to the photographed image data S2.

Accordingly, the control processing section 17 performs a process of providing only the monitoring object data S5 including rectangular frame data D1 to the converters 15(1) to 15(3). This process will be described below in detail.

As a pre-stage of the adding process, the control processing section 17 instructs each of the detectors forming the detecting section 14 of an address in the image memory 13 at which address to store monitoring object data S5 (ST40).

After the detecting process ends, the control processing section 17 obtains the monitoring object data S5 stored in the image memory 13 from the detecting section 14 (ST41). Of course, the control processing section 17 may directly access the image memory 13 to read the monitoring object data S5.

The control processing section 17 thereafter determines whether the number N of pieces of rectangular frame data D1 (rectangular frame data number) included in the monitoring object data S5 is N=0 (ST42).

When the rectangular frame data number N is N=0 (YES), the control processing section 17 accesses the image memory 13, and discards the monitoring object data S5 whose rectangular frame data number N is N=0 (ST43).

When the rectangular frame data number N is not N=0 (NO), on the other hand, the control processing section 17 determines whether to discard all the monitoring object data S5 stored in the image memory 13 (ST44).

That is, the control processing section 17 determines whether to discard also the monitoring object data S5 of other frames including the monitoring object data S5 with N=0.

When all the monitoring object data S5 is discarded (YES), the process of step ST40 is resumed. This is because when the monitoring object data S5 does not include the rectangular frame data D1 of a rectangular frame F to be added, the rectangular frame data D1 does not need to be added to the photographed image data S2.

When not all the monitoring object data S5 is discarded (NO), the control processing section 17 makes the converters 15(1) to 15(3) to which processes are assigned in the initializing process read the monitoring object data S5 from the image memory 13.

As described above, the first embodiment of the present invention provides the following effects.

Not only a moving object in motion but also a non-moving object (stationary object) standing still for a certain time can be made to be a monitoring object. Thereby, a suspicious bag, a suspicious car at a stop, and the like can be monitored.

In addition, the face of a person is also displayed in an enlarged state so as to be easily recognized. Therefore it is also easy to monitor people.

A rectangular frame F is added to the peripheries of images of a moving object and a non-moving object (stationary object). Therefore the monitoring objects become clear. In particular, a stationary time T is displayed on the periphery of the image of the non-moving object (stationary object). Thus a time from a point in time when the non-moving object (stationary object) stopped can be grasped.

Different images of each monitoring object are displayed as one monitoring image. Therefore a plurality of monitoring objects can be monitored simultaneously.

The detecting section for detecting the monitoring objects and the generating section can be configured according to types of monitoring objects. Thus, excellent extensibility can be obtained, and images can be generated by the types of the monitoring objects.

A single monitoring device 10 performs processes from the photographing of a monitoring area to the generation of final monitoring image data. Therefore a server device performing image processing or the like other than the monitoring device 10 is not demanded.

In the present embodiment, the configuration of the monitoring device 10 can be changed as follows, for example.

In a case of further adding a monitoring object such for example as a stationary person, a non-moving object (stationary person) detector for detecting a stationary person can be provided in the detecting section 14. In this case, it suffices to provide a new converter for adding a rectangular frame F and a stationary time T to the periphery of an image of the person in the generating section 15.

Another synthesizing section can be added to generate a plurality of pieces of monitoring image data S12. It is thereby possible to output the pieces of monitoring image data S12 from one monitoring device 10 to a plurality of display devices.

2. Second Embodiment

Second Example of Configuration of Image Processing System

An example of configuration of a more versatile image processing system will next be described with reference to FIG. 12 and FIG. 13.

FIG. 12 is a diagram showing an example of general configuration of an image processing system according to a second embodiment of the present invention.

As shown in FIG. 12, the image processing system 100 includes a camera device 200 (-1 and -2) including an image processing device according to an embodiment of the present invention, a plurality of communicating devices (receivers) 300 (-1 to -n) having a communicating function, and a network 400.

The image processing device as a main constituent part of the camera device 200 according to the second embodiment has the following functions.

As with the monitoring device according to the first embodiment, the camera device 200 has a function of generating images of a plurality of different picture frames from one input image and encoding the images.

The camera device 200 has a function of combining an independent OSD (On-Screen Display) (foreground image) with the images of the plurality of different picture frames and outputting the result.

The camera device 200 has a function capable of performing electronic zoom and pan/tilt control on the images of the plurality of different picture frames independently.

The camera device 200 has a function capable of synthesizing all or a part of the plurality of images and outputting one image.

The camera device 200 has a function capable of performing a plurality of kinds of detecting processes such as a non-moving object detection, a moving object detection, a face detection and the like from an input image. This detecting process function is realized by a similar function to that of the monitoring device according to the first embodiment.

The camera device 200 has a function capable of generating images of respective different picture frames according to the detecting processes of a detecting section, and has a function capable of combining the above-described OSD with the images obtained by performing the detecting processes and adding detection information to the images.

The camera device 200 has a function of performing streaming distribution of a plurality of generated images to different communicating devices.

The camera device 200 also has a function of allowing each communicating device side to set detection objects.

The camera device 200 has a function capable of storing an image in streaming distribution.

The camera device 200 also has an encoding function.

This encoding function includes an encoding process function that encodes at least a single piece of moving image data on a time division basis according to an encoding instruction and generating a plurality of pieces of encoded data with different attributes.

The encoding function further includes a function of determining order of encoding of moving image data for each frame image as an object of an encoding process on the basis of a priority item related to encoding data with an attribute to be generated preferentially. The encoding function has a function of sending the determined encoding order as an encoding instruction to the encoding process function.

A concrete configuration of the camera device 200 having such functions will be described later in detail.

An outline of general configuration and functions of the image processing system 100 will first be described in the following.

[Outline of Image Processing System]

The camera device 200 is connected to the network 400. The camera device 200 can receive requests from a plurality of communicating devices (receivers, which will hereinafter be referred to as clients).

There are a plurality of clients 300 making a request to the camera device 200 on the network 400.

The clients 300 (-1 to -n, with n=3 in the example of FIG. 12) can access the camera device 200 via the network 400.

In the example of FIG. 12, the client 300-1 is formed by a personal computer (PC). The client 300-2' is formed by a portable telephone. The client 300-3 is formed by a workstation. The workstation is connected with a display device 302 via a network or a dedicated line 301, for example.

The camera device 200 has server functions such as an image detecting process including moving object detection, non-moving object (stationary object) detection and the like, the storing of images, streaming distribution, and monitoring notification.

Each client 300 can make a request to the camera device 200 as follows.

The request includes a monitoring object, a monitoring start time and a monitoring end time, a notification method selection, streaming distribution. ON/OFF, image size, the storing of monitoring images, the downloading of the stored monitoring images, audio distribution ON/OFF, and the like.

Each client 300 can perform operation on the camera device 200 in arbitrary timing which operation includes setting as described above, streaming reception, and electronic zoom and pan/tilt control on an image being received in real time.

When a monitoring system specialized for a purpose such as a traffic congestion detecting system or the like is constructed, a system can be constructed for example which is provided with one high-performance workstation as a client 300 and which performs a process on the basis of images received from a plurality of camera devices 200.

Thus, a common monitoring system can be constructed using the camera device 200.

FIGS. 13A to 13E are diagrams showing images transmitted to clients after the camera device according to the second embodiment performs predetermined processing on a camera input image.

In this case, the number of clients CLE is four, as illustrated in FIGS. 13A to 13D. FIG. 13E shows the camera input image of the camera device 200.

Incidentally, the contents of the images shown in FIGS. 13A to 13E are the same as in FIG. 2 and FIG. 3 except the trees.

Specifically, the photographed image includes a moving object, a non-moving object (stationary object), and the face of a person.

The moving object is a person or a thing in motion, such as a person P who is walking or a car that is running (not shown), for example.

The non-moving object (stationary object) is a thing or a person that is not moving (stationary) for a certain time, such as a bag B left on a street, a car C at a stop, or a person standing still (not shown), for example.

As shown in FIG. 13A, the client CLE1 has made a setting of "non-moving object detection" on the camera device 200, and therefore detection information on non-moving objects such as the bag B and the car C as shown in the figure can be checked from the image.

The client CLE2 has made a setting of "face detection," and is therefore receiving an image in which the face of the person P is enlarged as shown in FIG. 13B.

The client CLE3 has made a setting of "moving object detection," and is therefore receiving an image together with detection information on the person P as shown in FIG. 13C.

The client CLE4 has made two kinds of settings of "no detecting object" and "moving object detection," and is receiving two images. In FIG. 13D, a received image a is an image of "no detecting object," in which image the car is enlarged by electronic zoom and pan/tilt operation.

Thus, in the second embodiment, the client side itself can monitor a specific object by electronic zoom and pan/tilt operation. A received image b is obtained by making the setting of "moving object detection."

As described above, the camera device 200 can simultaneously meet a plurality of kinds of requests from respective clients.

A concrete configuration and functions of the camera device 200 according to the second embodiment of the present invention will next be described.

Figure 14:
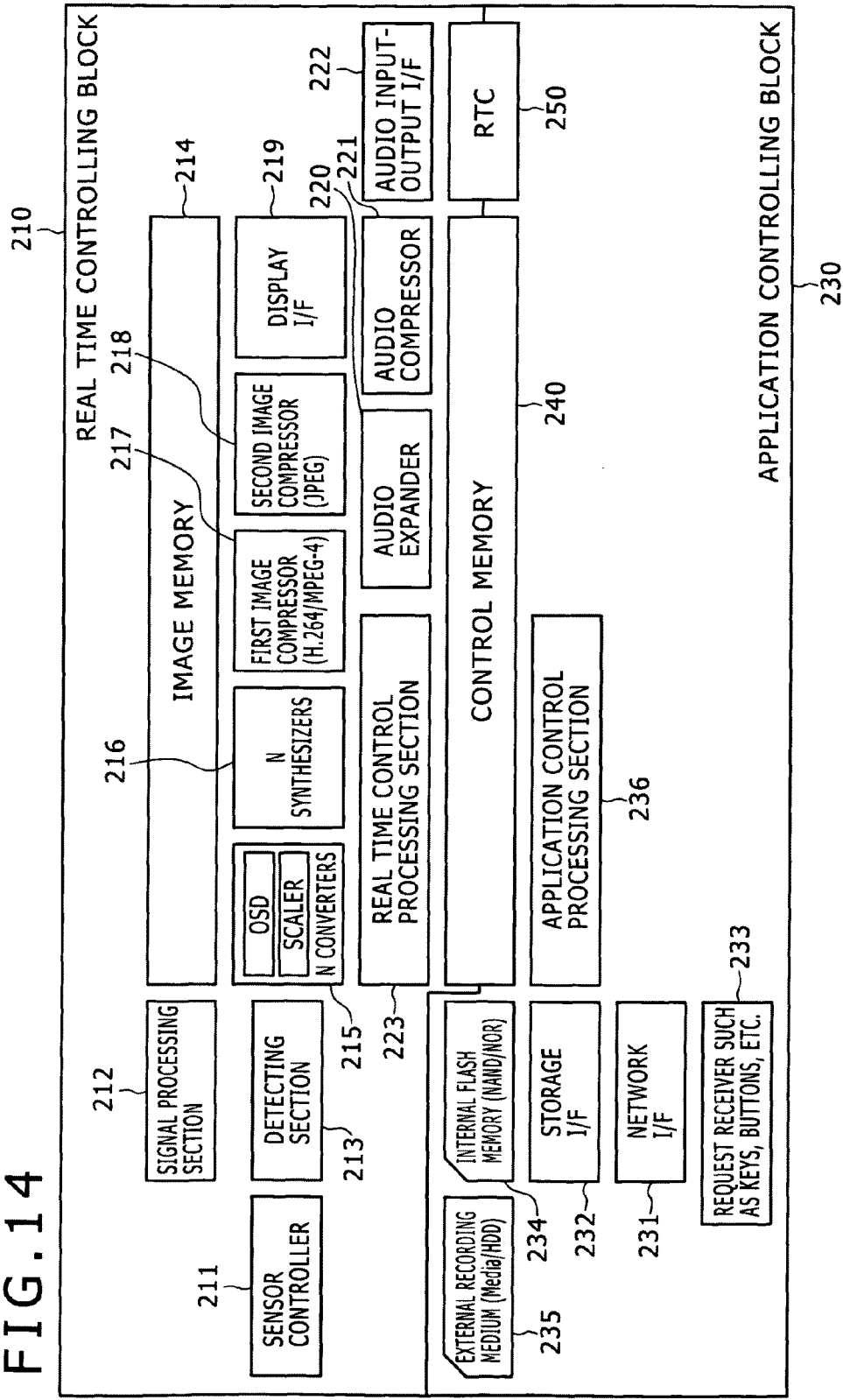
FIG. 14 is a diagram showing a general configuration in the camera device according to the second embodiment of the present invention.

FIG. 14 is a diagram showing a general configuration in the camera device according to the second embodiment of the present invention.

The camera device 200 has a real time controlling block 210, an application controlling block 230, a control memory 240, and an RTC (Real Time Clock) 250 as main constituent elements.

The real time controlling block 210 mainly performs detection, conversion, synthesis, compression, and audio-related processing on an input image from a sensor such as a CMOS (Complementary Metal Oxide Semiconductor) image sensor or the like.

The application controlling block 230 performs processing on storage, network-related processing, external input processing, and instruction of the real time controlling block 210.

Communications between the real time controlling block 210 and the application controlling block 230 are performed through the control memory 240.

The real time controlling block 210 has a sensor controller 211, a signal processing section 212, a detecting section 213, an image memory 214, N converters 215, N synthesizers 216, image compressors 217 and 218, and a display interface (I/F) 219.

The real time controlling block 210 has an audio expander 220, an audio compressor 221, an audio input-output I/F 222, and a real time control processing section 223.

Incidentally, the signal processing section 212, the detecting section 213, the image memory 214, and the N converters 215 form an image processing device.

The audio expander 220, the audio compressor 221, and the audio input-output I/F 222 form an audio processing system.

The image compressors 217 and 218, the display interface (I/F) 219, and the real time control processing section 223 have functions of a processing unit.

The real time control processing section 223 is formed by a CPU, a DSP (Digital Signal Processor) or the like. The real time control processing section 223 controls various functional blocks of the real time controlling block 210.

The real time control processing section 223 makes a processing request to various blocks, and notifies a result of processing requested by the application controlling block 230 via the control memory 240.

The display I/F 219 and the audio input-output I/F 222 have a function of outputting an image or audio processed by the camera device 200 to an external device.

In addition, the real time controlling block 210 can make a time setting by the RTC 250. An initial setting of the RTC 250 is made by the application controlling block 230.

The image processing of the real time controlling block 210 will be described later in detail.

The application controlling block 230 will be described next.

The application controlling block 230 has a network I/F 231, a storage I/F 232, a request receiver 233, an internal flash memory 234, an external recording medium 235, and an application control processing section 236.

The application controlling block 230 has functions of a processing block, and receives a request from a client CLE through the network I/F 231.

Request contents that the application controlling block 230 receives from a client CLE are shown in Table 1 and Table 2.

Table 1 shows main items set on the camera device 200 by a client CLE.

Table 2 shows items that need settings corresponding to the number of monitoring objects in Table 1 and items set for each divided image on the camera device 200.

TABLE 1

First request items received by the camera device from a client. Main items set on the camera. device.

| | |
|---|---|
| IMAGE ID | 1 TO N (DISPLAYED ON MONITORING CAMERA SIDE) |
| NUMBER OF MONITORING OBJECTS (NUMBER OF DIVIDED SCREENS) | 1 TO N |
| OUTPUT SETTING | DISPLAY DEVICE/ COMPRESSING DEVICE |
| STREAMING DISTRIBUTION | ON/OFF |
| MONITORING TIME DESIGNATION | START TIME END TIME |
| IMAGE SETTING | CODEC |
| BIT RATE VALUE | VALUE |
| FRAME RATE VALUE | VALUE |
| IMAGE STORING | ON/OFF |

TABLE 2

Second request items received by the camera device from a client. Items that need settings corresponding to the number of monitoring objects in Table 1. Items set for each divided image on the camera device.

| | |
|---|---|
| DIVIDED SCREEN ID | 1 TO N (DISPLAYED ON MONITORING CAMERA SIDE) |
| IMAGE SIZE | WIDTH × HEIGHT |
| IMAGE DISPOSITION | X, Y |

TABLE 2-continued

Second request items received by the camera device from a
client. Items that need settings corresponding to the
number of monitoring objects in Table 1. Items set for
each divided image on the camera device.

| | |
|---|---|
| COORDINATES | |
| MONITORING OBJECT: SETTINGS CORRESPONDING TO NUMBER OF MONITORING OBJECTS | NO MONITORING OBJECT<br>MOVING OBJECT DETECTION<br>NON-MOVING OBJECT DETECTION<br>FACE DETECTION |
| MONITORING OBJECT INFORMATION ADDITION | ON/OFF |
| MONITORING OBJECT ADDED INFORMATION COORDINATES | X, Y |
| SCREEN OPERATION | ENLARGING OPERATION<br>REDUCING OPERATION<br>POSITION OPERATION (UP)<br>POSITION OPERATION (DOWN)<br>POSITION OPERATION (LEFT)<br>POSITION OPERATION (RIGHT) |
| AUDIO NOTIFICATION TO CLIENT | ON/OFF |

In Table 1, the "image ID" is an ID for uniquely identifying the client. The image ID has a value coinciding with an "image ID (FIG. 21)" notified to the real time control processing section 223.

The application controlling block 230 registers an image ID when a request is made from a new client, and makes a processing request to the real time controlling block 210 on the basis of the ID.

The number of divisions of a streaming screen received by the client is the "number of monitoring objects."

As shown in FIG. 13D, the screen is divided when a plurality of monitoring objects are set. Items set for each of the screens are items shown in Table 2.

When a value of two or more is set as the "number of monitoring objects," a "setting of operation of the synthesizers 216" is designated to be on, and notified to the real time controlling block 210.

As the "number of monitoring objects" in Table 1, a value of one indicating nonuse to N can be set from among values including the number of converters 215 retained by the camera device 200 as a maximum value. This maximum value is increased when a converter 215 is added to the camera device 200.

The "output setting" designates a display output when output is desired to be produced to a monitor connected to the camera device 200.

The "streaming distribution" can be set to ON/OFF. When the streaming distribution is set to ON, the client can receive a streaming of contents set in Table 1 and Table 2.

The "monitoring time designation" can designate a time for monitoring. When the set time arrives, the camera device 200 starts streaming distribution.

Time management is performed by the application control processing section 236. Streaming distribution or image storing is performed according to setting contents when the designated time arrives.

The "image setting" designates a codec. In addition, a bit rate value and a frame rate value are set as the "bit rate value" and the "frame rate value."

The "image storing" allows a monitoring image to be stored in a storage.

Each of the items in Table 2 is set a number of times corresponding to the "number of monitoring objects" in Table 1.

The "divided screen ID" represents an ID number set by the camera device 200. This value is notified as a "converter ID" to the real time controlling block 210.

The "image size" indicates the image size of the divided screen.

The "image disposition coordinates" indicates coordinates at which the divided screen as an object is disposed, and is set with a corner at an upper left as (0, 0).

While there are four types of "monitoring object" in Table 2, the types of the "monitoring object" can be increased when a new detecting process is added to the detecting section 213 in FIG. 14.

The "monitoring object information addition" is rectangular information added to a detected object as shown in FIG. 3 and FIGS. 13A to 13E. In addition, in the case of non-moving object (stationary object) detection, a non-moving time (stationary time) is added information.

The "monitoring object added information coordinates" indicates coordinates that can be specified within a range set by the "image size."

The client can perform ON/OFF switching of the "streaming distribution." When the client turns on the "streaming distribution," the client can receive an image on a web screen, so that the image can be viewed through the camera device 200.

That is, the client can perform real time monitoring by setting the streaming distribution to ON.

Figure 23:
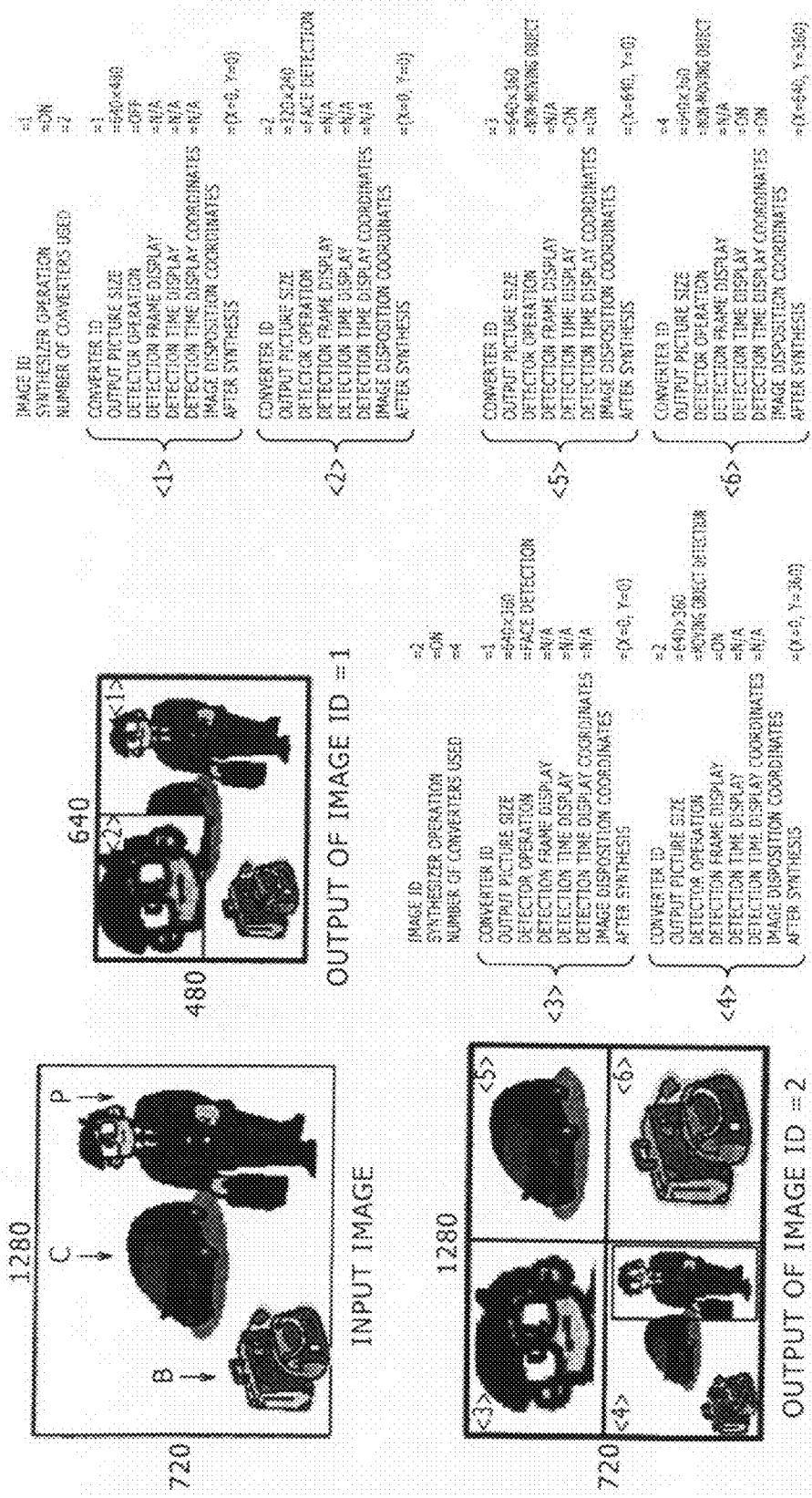
FIG. 23 is a diagram showing an example of settings of the image processing information according to the second embodiment and output images.

The "screen operation" allows enlarging/reducing operation and position operation on the above-described divided screen. When a processing request is made to the real time controlling block 210 on the basis of the corresponding divided screen ID, operation as shown in FIG. 23 to be described later is realized.

The "audio notification" is a setting item indicating whether to perform audio notification to the client in such a manner as to be interlocked with the detecting process when an object set as the "monitoring object" is detected by the camera device 200.

The camera device 200 receives the above-described setting items through the network I/F 231 in the application controlling block 230 in FIG. 14.

The application controlling block 230 makes a processing request to the real time controlling block 210 on the basis of the above items.

[Processing at Time of System Startup]

Figure 15:
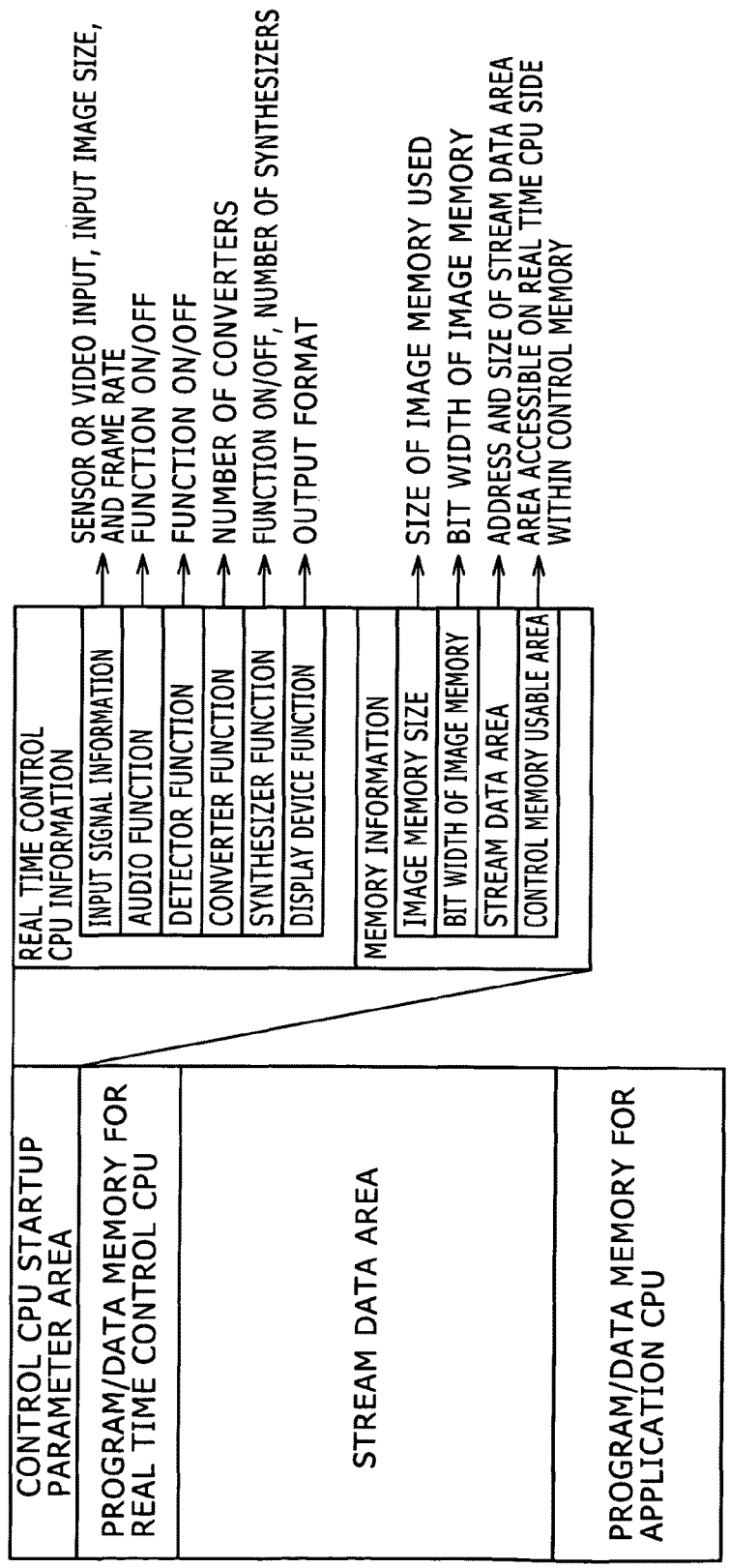
FIG. 15 is a diagram showing an example of configuration of a memory area of the camera device according to the second embodiment.

FIG. 15 is a diagram showing an example of configuration of a memory area of the camera device according to the second embodiment.

At the initial startup of the camera device 200, items of a "control CPU startup parameter area" shown in FIG. 15 are sent from the application controlling block 230 to the real time controlling block 210. A real time control CPU in this case corresponds to the real time control processing section 223 in FIG. 14.

Real time control CPU information is settings related to an input signal, an Audio/detecting function, and an output format.

Memory information is various memory information related to image processing.

Figure 16:
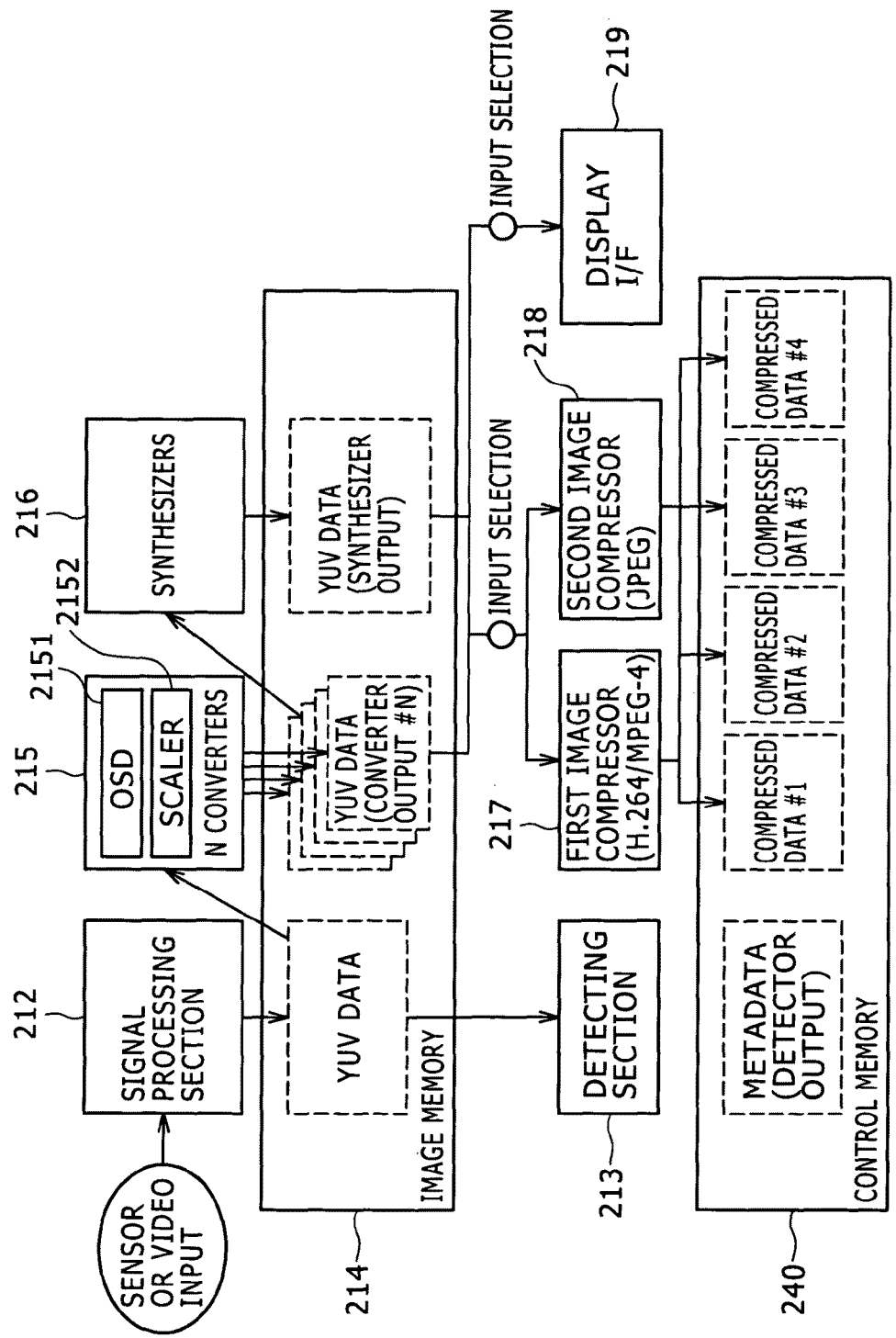
FIG. 16 is a diagram showing an image processing data flow of a real time processing section according to the second embodiment.

FIG. 16 is a diagram showing an image processing data flow in a real time processing section according to the second embodiment.

FIG. 16 shows data generated in processing by a frame of a broken line.

The whole of functional blocks in FIG. 16 is controlled by the real time control processing section 223 to realize processing.

The real time control processing section 223 initializes each block, and makes processing requests. In addition, the real time control processing section 223 responds to requests from the application controlling block 230 on the basis of various data generated during the processing of the whole.

When the signal processing section 212 receives an input image from an external sensor or a video input, the signal processing section 212 performs preprocessing, and stores YUV data in the image memory 214.

Thereafter, the detecting section 213 detects a "moving object" and a "non-moving object" within the YUV data. The detecting process is performed in the same manner as in the first embodiment, and therefore detailed description thereof will be omitted.

The detecting section 213 determines what to detect according to a request from the real time control processing section 223.

After ending the detecting process, the detecting section 213 stores a result of the process as metadata in the control memory 240.

The signal processing section 212, the detecting section 213, the converters 215, and the synthesizers 216 have basic functions similar to those of the preprocessing section 12, the detecting section 14, the converters of the generating section 15, and the synthesizing section 16 described in the first embodiment.

Description in the following will be made of the converters 215 and the image compressors 217 and 218 in FIG. 16.

[Converters]

A converter 215 having an OSD 2151 and a scaler 2152 performs an image edit on the basis of a request from the real time control processing section 223, the metadata obtained by the detecting section 213, and the YUV data, and outputs YUV data (converter output) to the image memory.

There are cases where the converter 215 is disposed singly and where a plurality of converters 215 are disposed.

In the case of the single converter 215, the converter 215 can output a plurality of pieces of YUV data (converter output) by performing time-series parallel operation.

In the case of the plurality of converters 215, the plurality of converters 215 can output a plurality of pieces of YUV data (converter output) by performing parallel operation.

The image edit functions of the converter 215 include the respective functions of a scaling edit, an electronic zoom edit, an electronic pan/tilt edit, and an OSD edit.

The meanings of the respective functions are as follows.

The scaling edit function includes a function of an edit of enlarging and reducing an input picture size to an output picture size.

The electronic zoom edit includes a function of cutting out only a region of interest and performing an edit of enlarging or reducing the cutout image to the output picture size.

The electronic pan/tilt edit function includes a function of panning/tilting the region of interest resulting from the electronic zoom edit.

The OSD edit function includes a function of combining OSD data with the input YUV data and outputting the result.

The following four requests will be illustrated as request contents of the real time control processing section 223.

The first request is a request to use the YUV data (converter output) output picture size for the scaling edit.

The second request is a request to use the coordinates and size of the region of interest of the input YUV data for the electronic zoom edit and the electronic pan/tilt edit.

The third request is a request to use the number of outputs of YUV data (converter outputs) in a case of a plurality of outputs.

The fourth request is a request to use output timing in the case of the plurality of outputs.

The metadata is used for the OSD edit. The metadata can be output as YUV data (converter output) with a frame attached to the region of interest.

Figure 17:
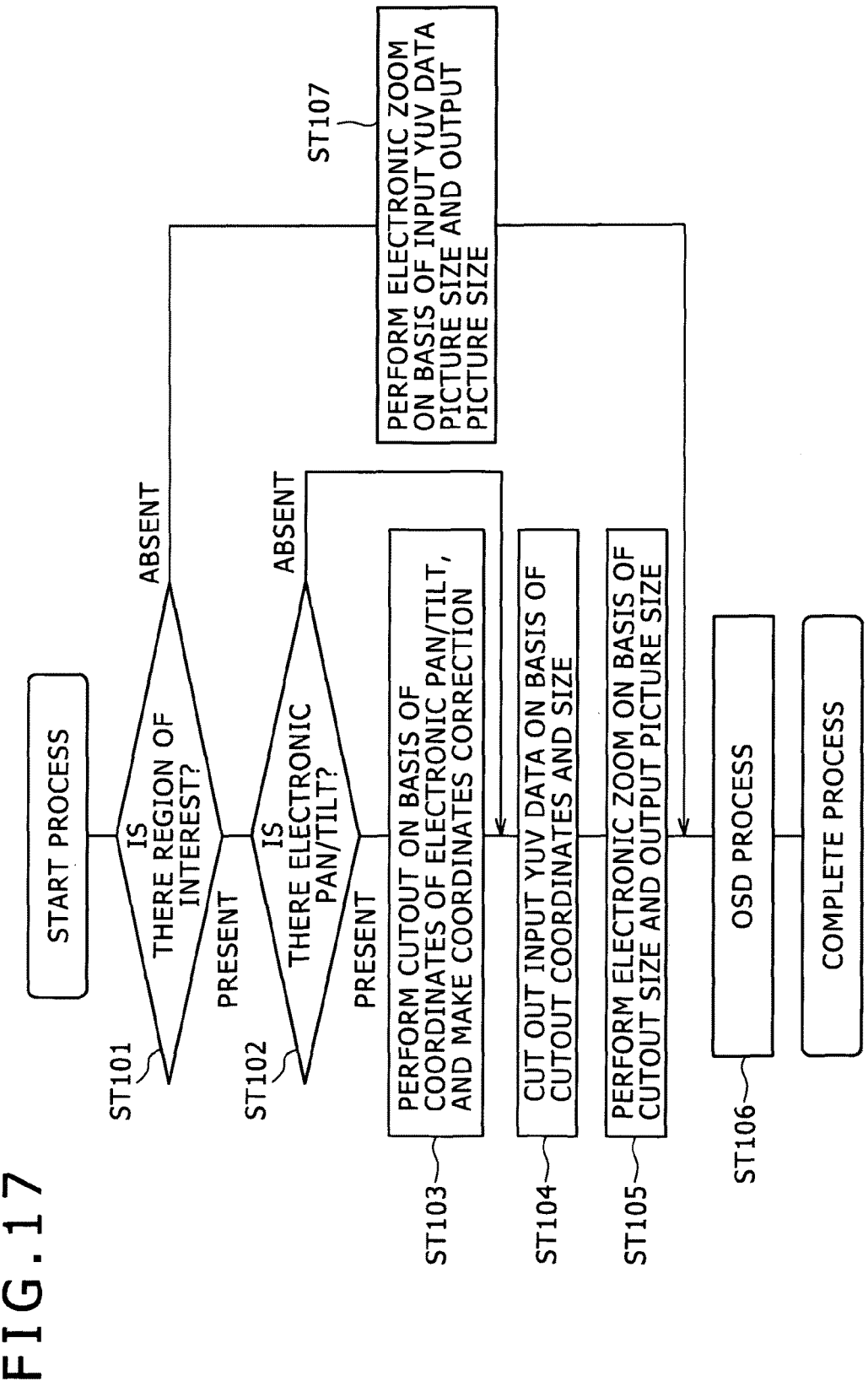
FIG. 17 is a diagram showing a first process flow of a converter according to the second embodiment.

FIG. 17 is a diagram showing a first process flow of the converter according to the second embodiment.

After the process is started, the converter 215 determines whether there is a region of interest (ST101).

When determining in step ST101 that there is a region of interest, the converter 215 determines whether there is an electronic pan/tilt (ST102).

When determining in step ST102 that there is an electronic pan/tilt, the converter 215 performs cutout on the basis of the coordinates of the electronic pan/tilt, and makes coordinates correction (ST103).

After the correction process in step ST103, or when the converter 215 determines in step ST102 that there is no electronic pan/tilt, the converter 215 cuts out input YUV data on the basis of cutout coordinates and size (ST104).

Next, an electronic zoom is performed on the basis of the cutout size and the output picture size (ST105).

Next, an OSD process is performed (ST106).

When the converter 215 determines that there is no region of interest in step ST101, the converter 215 performs an electronic zoom on the basis of the input YUV data picture size and the output picture size (ST107), and proceeds to the OSD process in step ST106.

Figure 18:
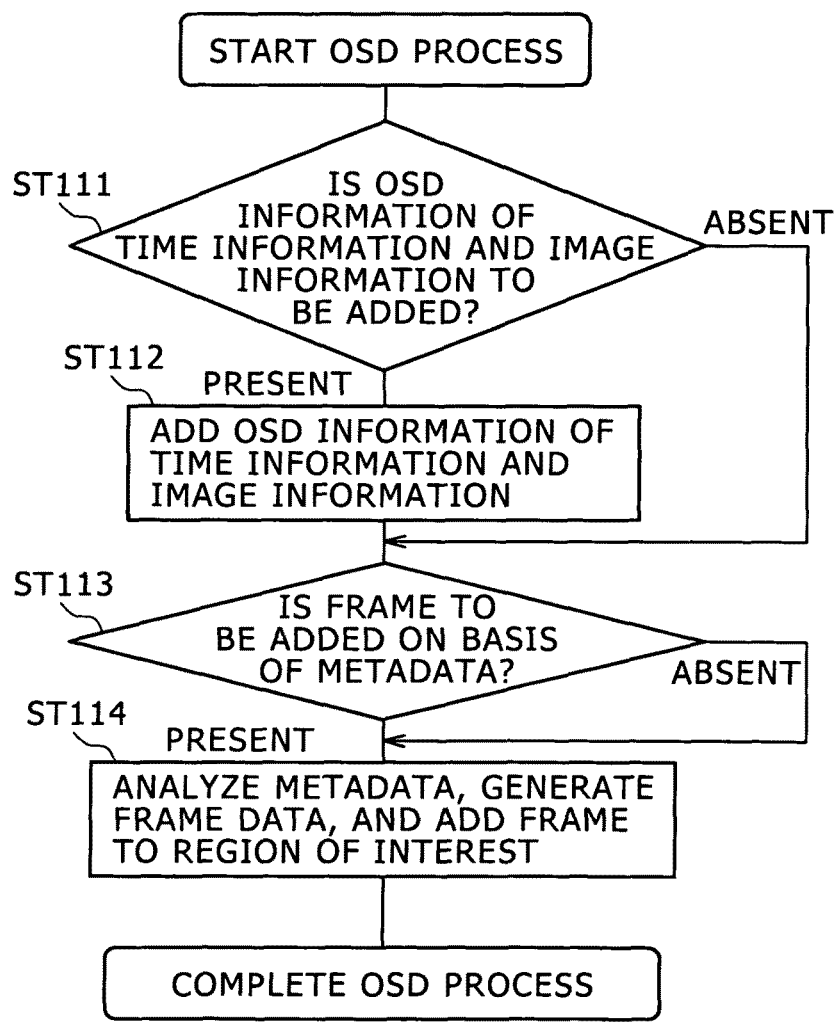
FIG. 18 is a diagram showing a second process flow of the converter according to the second embodiment.

FIG. 18 is a diagram showing a second process flow of the converter according to the second embodiment.

When the OSD process is started, the converter 215 determines whether or not to add the OSD information of time information and image information (ST111).

When determining in step ST111 that there is OSD additional information, the converter 215 adds the OSD information of the time information and the image information (ST112).

After the process of step ST112 or when the converter 215 determines in step ST111 that there is no OSD additional information, the converter 215 determines whether or not to add a frame on the basis of the metadata (ST113).

Next, the converter 215 analyzes the metadata, generates frame data, and adds a frame to the region of interest (ST114).

[Image Compressors]

On the basis of a request of the real time control processing section 223 and YUV data (converter output) or YUV data (synthesizer output), the image compressors 217 and 218 perform a process of compression into a format in accordance with the request of the real time control processing section 223. The image compressors 217 and 218 output compressed data to the control memory 240.

As with the converter 215, there are cases where the image compressor 217 or 218 is disposed singly and where a plurality of image compressors 217 and 218 are disposed.

In the case of the single image compressor 217 or 218, the image compressor can output a plurality of pieces of compressed data by performing time-series parallel operation.

In the case of the plurality of image compressors 217 and 218, the plurality of image compressors can output a plurality of pieces of compressed data by performing parallel operation.

In the present embodiment, a case where a plurality of image compressors, that is, the two image compressors 217 and 218 are used is illustrated.

The image compressors 217 and 218 need one piece of image compression information to generate one type of image compressed data.

This image compression information is input by the real time control processing section 223.

The image compression information for moving images and still images is as follows.

[Image Compression Information for Moving Images]

The image compression information for moving images includes a "compression format," a "compression picture size," a "compression bit rate," a "compression frame rate," "reference frame information used at a time of compression," and a "compression mode (CBR (Constant Bit Rate)/VBR (Variable Bit Rate) or the like)."

[Image Compression Information for Still Images]

The image compression information for still images includes a "compression format," a "compression picture size," and "quality."

A request is made by the real time control processing section 223 when compressed data of one frame is generated. The contents of the request are as follows.

[Request Contents from Real Time Control Processing Section]

Request contents from the real time control processing section 223 include the "address and size of input YUV data (converter output)," the "address and size of output compressed data," and the "image compression information (image compression information for moving images or image compression information for still images)."

The image compressors 217 and 218 also have a function of compressing a region of interest included in metadata with high image quality.

Figure 19B:
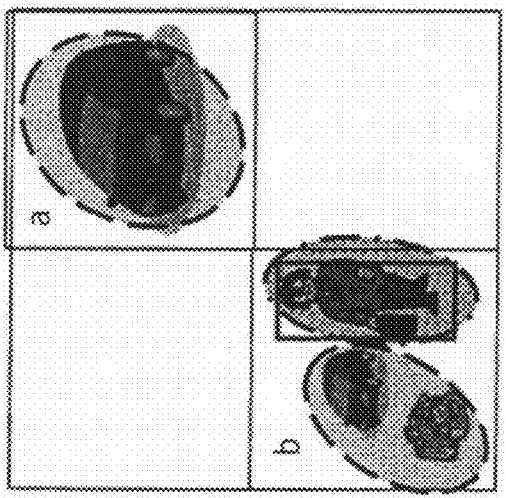
FIGS. 19A and 19B are diagrams showing elemental images of an image compressing process.
Figure 19A:
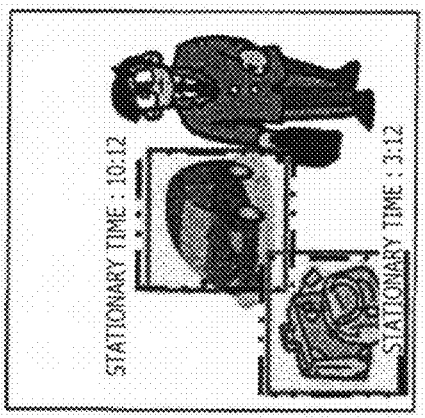

FIGS. 19A and 19B are diagrams showing elemental images of an image compressing process.

FIG. 19A shows an image in a case of high image quality of regions of interest. FIG. 19B shows an image in a case of a synthesized image.

As shown in FIGS. 19A and 19B, the image compressor 217 also has a high image quality function that automatically assigns many bits to the part of a moving object and assigns a minimum amount of bits to the part of a non-moving object when compressing a synthesized image as a moving image.

FIG. 20 is a diagram showing a process flow of an image compressor according to the second embodiment.

For example, when a compressing process is started, the image compressor 217 determines whether there is an image of high image quality of a region of interest on the basis of metadata (ST121).

When determining in step ST121 that there is no image of high image quality, the image compressor 217 compresses an image according to the request contents of the real time control processing section 223 and a region of interest (ST122).

After determining in step ST121 that there is an image of high image quality, or after the process of step ST122, the image compressor 217 compresses an image according to the request contents of the real time control processing section 223 and the coordinates of a region of interest (ST123).

As an initial setting, the application control processing section 236 notifies the real time control processing section 223 of information as shown in FIG. 21 on the basis of a client request described in Table 1.

FIG. 21 is a diagram showing an example of image processing information notified from the application control processing section according to the second embodiment.

The image processing information of FIG. 21 is as follows.

This image processing information includes an "image ID," an "output destination setting (display device/compressing device)," "image compression information (when an output destination is other than a display device)," a "synthesizer operation setting (ON/OFF)," the "number of converters used," a "compression bit rate," and a "compression frame rate."

The image processing information includes a "converter ID," an "output picture size setting (Width×Height)," a "detector operation setting (OFF/moving object detection/non-moving object detection/face detection)," and a "detection frame display setting (ON/OFF)."

The image processing information includes a "detection time display setting (ON/OFF)," a "detection time display start coordinate setting (X, Y)," and "image disposition coordinates (X, Y) after synthesis."

Of these pieces of image processing information, the information from the "converter ID" to the "image disposition coordinates (X, Y) after synthesis" is notified per converter used.

On the basis of the above-described image processing information, as shown in the image processing data flow of FIG. 16, the real time control processing section 223 initializes the detecting section 213, the converters 215, the synthesizers 216, and the image compressors 217 and 218 or a display device, and starts image processing.

Figure 22:
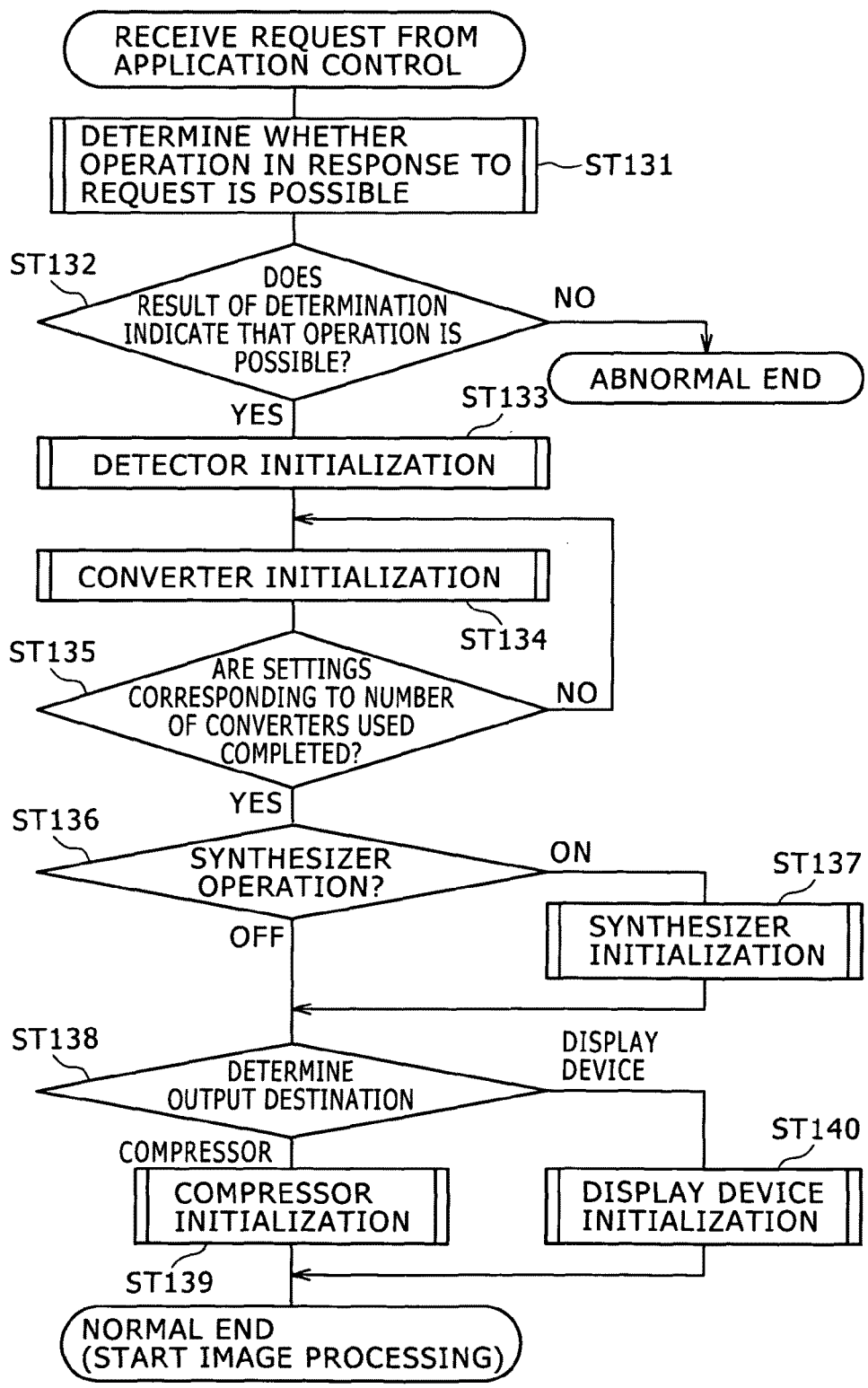
FIG. 22 is a diagram showing an initializing flow in a real time controlling block according to the second embodiment.

FIG. 22 is a diagram showing an initializing flow in the real time controlling block according to the second embodiment.

Receiving a request from the application controlling block 230, the real time controlling block 210 determines whether operation in response to the request is possible (ST131 and ST132).

When a result of determining whether operation in response to the request is possible indicates that the operation is impossible, an abnormal end is effected.

When a result of determining whether operation in response to the request is possible indicates that the operation is possible, the real time controlling block 210 initializes the detecting section 213 (ST133).

The real time controlling block 210 initializes the converters 215 (ST134).

When initializations corresponding to the number of converters 215 used are completed (ST135), the real time controlling block 210 selects the operation of the synthesizers 216 to be turned on or turned off (ST136).

When turning on the synthesizers 216, the real time controlling block 210 initializes the synthesizers 216 (ST137).

When turning off the synthesizers 216, or after the initialization of the synthesizers 216, the real time controlling block 210 determines an output destination (ST138).

When the output destination is the compressors, the real time controlling block 210 initializes the compressors (ST139). When the output destination is a display device, the real time controlling block 210 initializes the display device (ST140).

A normal end is effected by the above process, and image processing is started.

After the normal end of the initialization described in FIG. 22, an image is output from the converters 215 and the synthesizers 216 according to the image processing information.

FIG. 23 is a diagram showing an example of settings of the image processing information according to the second embodiment and output images.

Images <1> to <6> in FIG. 23 are output by respective converters, and images enclosed by a thick frame are output by a synthesizer.

An image ID=1 indicates an image obtained by using two converters 215, enlarging the part of a face detected by face detection with respect to an image obtained by reducing an input image, and combining the part of the face with the image in a PinP form.

An image ID=2 indicates an image obtained by using four converters, enlarging or reducing a face detection image, a moving object image, and a non-moving object detection image, and combining the images in a form in which a screen is divided into four parts in a final picture size equal to that of the original image.

Figure 24:
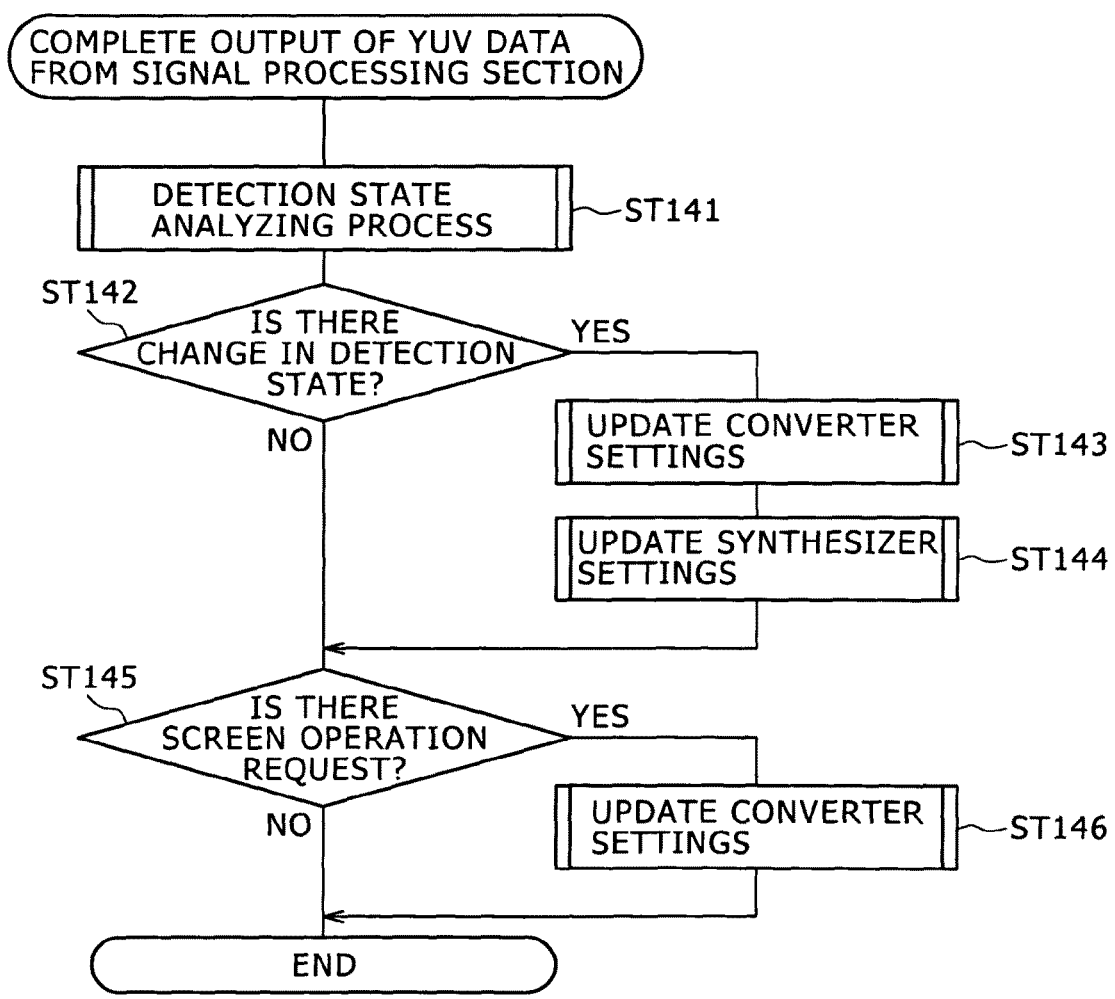
FIG. 24 is a diagram showing a process flow during operation in the real time controlling block according to the second embodiment.

After the image processing is started, the process of a flow shown in FIG. 24 is performed in timing in which YUV data is output from the signal processing section 212 to image data, for example a frame rate cycle of input signal information of startup parameter information.

Then, on the basis of the following, information, the settings of the converters 215 are updated, and an input image input to the image compressors and an output device is updated.

FIG. 24 is a diagram showing a process flow during operation in the real time controlling block according to the second embodiment.

When the output of YUV data from the signal processing section 212 is completed, the real time controlling block 210 performs a detection state analyzing process (ST141 and ST142).

When there is a change in detection state, the real time controlling block 210 updates the settings of the converters 215 (ST143), and updates the settings of the synthesizers 216 (ST144).

Then, when there is no change in detection state, or after updating the settings of the synthesizers, the real time controlling block 210 determines whether there is a screen operation request (ST145).

When there is a screen operation request, the real time controlling block 210 updates the settings of the converters 215 (ST146).

Then, when there is no screen operation request, or after updating the settings of the converters, the real time controlling block 210 ends the process.

Figure 25:
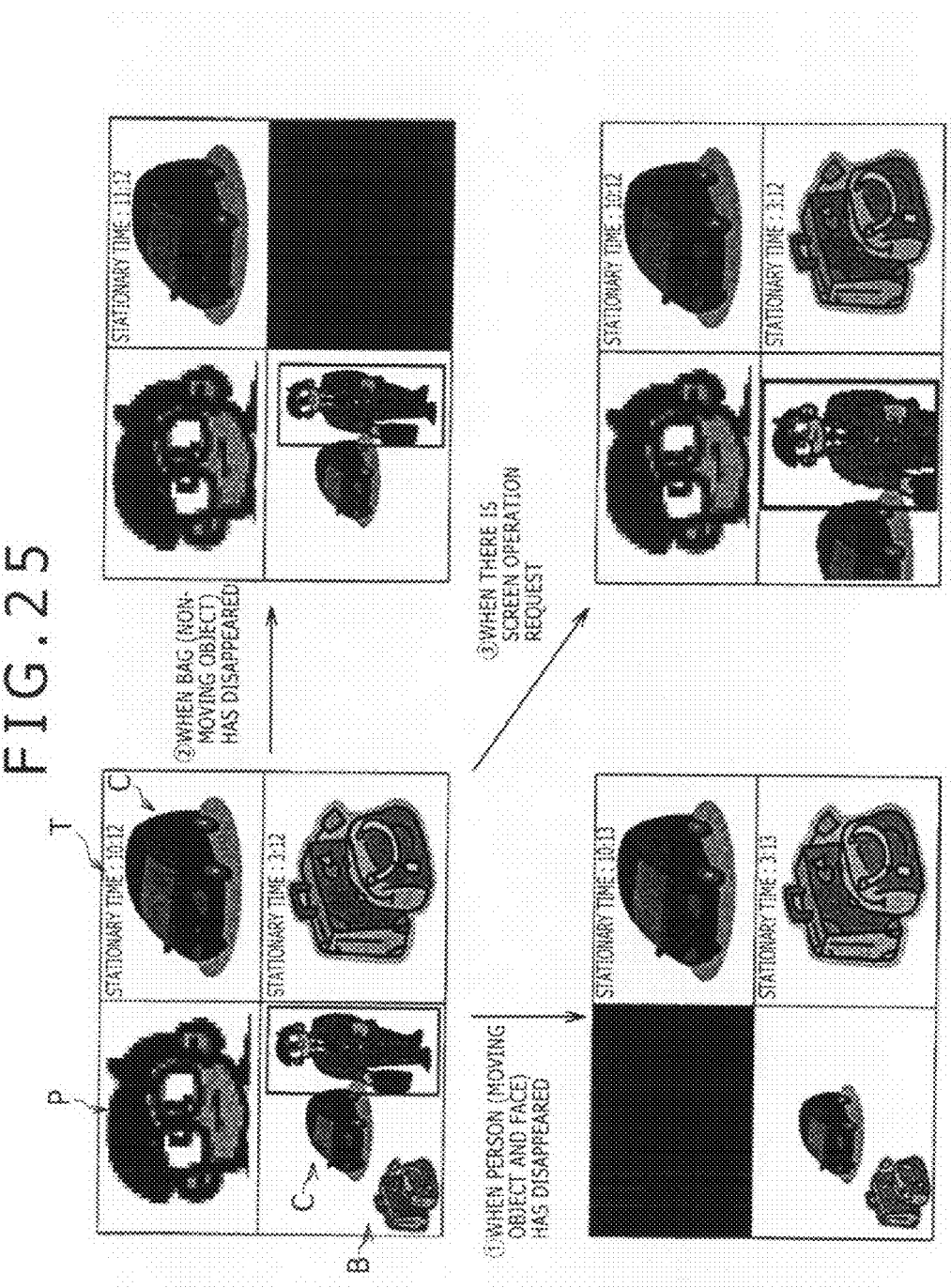
FIG. 25 is a diagram showing images output after the settings of converters and synthesizers are updated according to a detection state and presence or absence of a screen operation request in the second embodiment.

FIG. 25 is a diagram showing images output after the settings of the converters and the synthesizers are updated according to the detection state and presence or absence of the screen operation request in the second embodiment.

[Determination of Possibility of Operation in Response to Request]

The determination of the possibility of operation in response to the request from the application control processing section 236 in the initializing flow shown in FIG. 22 is determining whether operation in response to the specified request is possible within an upper limit performance of the real time controlling block 210.

The upper limit performance of the real time controlling block 210 is determined by the N converters, an amount of processing pixels of the image compressors, and the memory band of the image memory 214, and is varied according to the system configuration. Therefore the upper limit performance of the real time controlling block 210 is determined dynamically at the time of initialization.

By dynamically making the operation possibility determination, a combination of an arbitrary picture frame size and a frame rate is made possible in the real time controlling block 210, and effective use can be made of the performance of the device as a whole.

[Algorithm for Operation Possibility Determination]

Suppose that in the device configuration shown in FIG. 14, the pixel quantity of an image read from the image memory by the N converters is Xn (n=1 to N), the pixel quantity of an image written to the image memory after a converting process by the N converters is Yn (n=1 to N), and respective performance upper limits thereof are Xmax and Ymax.

Similarly, suppose that the pixel quantity of an image read from the image memory 214 by the image compressors 217 and 218 is P and that a performance upper limit is Pmax. Suppose that the memory band of the image memory 214 is Z.

The pixel quantity of each process is expressed as (Picture Frame Size×Frame Rate).

It is determined that the operation is possible when all of determination equations shown in the following are satisfied.

$$X\max \geq \Sigma Xn \ (n=1 \text{ to } N)$$

$$Y\max \geq \Sigma Yn \ (n=1 \text{ to } N)$$

$$P\max \geq \Sigma Yn \ (n=1 \text{ to } N)$$

$$Z=(\Sigma Xn+\Sigma Yn\times 2)\times \alpha \qquad \text{[Equation 1]}$$

where α denotes a coefficient depending on the number of image memories connected to the system.

The operation possibility determination is made according to only the processing pixel quantities of the converters 215 and the band of the image memory 214 rather than a predetermined fixed picture frame size and a frame rate. Thus, when the request from the application control processing section 236 is within these ranges (performance upper limits), the operation is possible in an arbitrary combination.

[Example of Cooperation between Detecting Section and Audio]

Audio streaming distribution using a monitoring notification from the detecting section 213, the audio compressor 221, and the audio input-output I/F 222 can be cited as an example of practical use.

Further, various examples of practical use can be cited by combining audio output from the camera device 200 using the audio expander 220 and the audio input-output I/F 222.

1. A first example of practical use is a device that notifies a distance to a specific area to a moving object or a monitoring person by automatically changing a sound volume or an audio pattern according to a position where the moving object is detected.

For a specific area, a plurality of {monitoring objects} are set as {moving object detection} according to a distance to the area.

In addition, a setting is made in the application controlling block 230 such that an application performing audio streaming distribution or an application outputting audio from the camera device 200 starts in response to a {monitoring notification}.

In addition, suppose that the application to be started can set a different sound volume or audio pattern for each {monitoring object}.

Thus, by making a setting so as to increase the sound volume gradually for a {monitoring object} close to a specific area, for example, when a moving object approaches the specific area, the degree of closeness of the moving object can be automatically notified to the moving object or a monitoring person.

Figure 26:
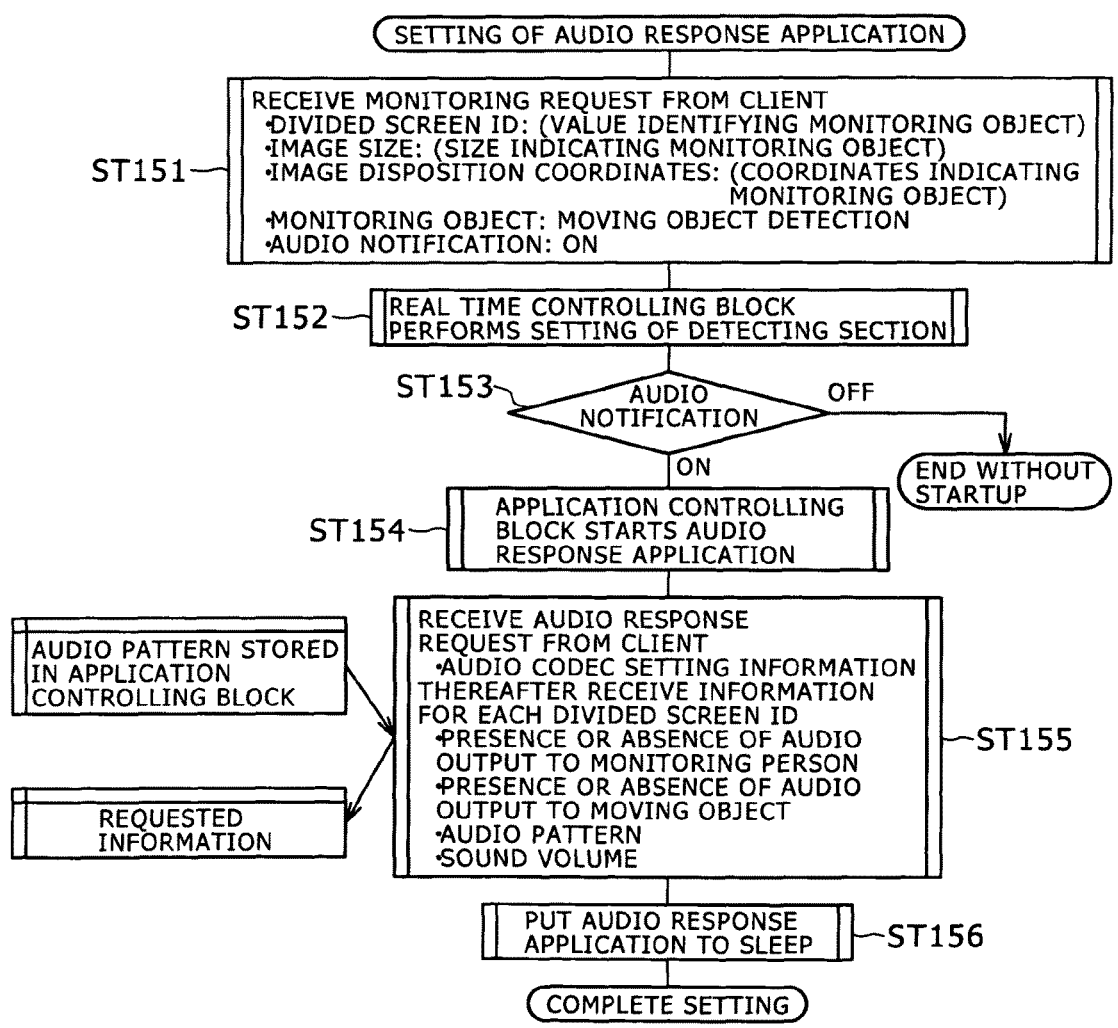
FIG. 26 is a flowchart of assistance in explaining a setting process of an application in the second embodiment.

FIG. 26 is a flowchart of assistance in explaining a setting process of the application in the second embodiment.

FIG. 27 is a flowchart of assistance in explaining an executing process of the application in the second embodiment.

The setting of the audio response application is made as follows (FIG. 26).

A monitoring request is received from a client (ST151).

The received request includes for example a "divided screen ID" as a value identifying a monitoring object, an "image size" as a size indicating the monitoring object, "image disposition coordinates" as coordinates indicating the monitoring object, "moving object detection" as {monitoring object}, and "audio notification ON."

Next, the real time controlling block 210 makes the setting of the detecting section 213 (ST152).

Next, whether audio notification is ON or OFF is determined (ST153).

When the audio notification is OFF, the process is ended without startup.

When the audio notification is ON, the application controlling block 230 starts the audio response application (ST154).

Next, an audio response request is received from the client, and audio codec setting information is obtained (ST155).

Thereafter information is received for each divided screen ID.

The information includes presence or absence of audio output to a monitoring person, presence or absence of audio output to a moving object, an audio pattern stored in the application controlling block, and a sound volume.

The requested information is transferred.

Then, the audio response application is put to sleep (ST156).

The audio response application is executed as follows (FIG. 27).

When the application controlling block 230 receives a moving object detection notification from the real time controlling block 210 (ST161), the application controlling block 230 starts the audio response application (ST162).

Next, a divided screen ID is obtained (ST163), and whether the divided screen ID is a valid ID is determined (ST164).

When the divided screen ID is a valid ID, information corresponding to the divided screen ID is read (ST165).

Next, whether to produce audio output for a monitoring person is determined (ST166).

When audio output is to be produced for a monitoring person, an audio pattern stored in the application controlling block 230 is read, and audio streaming distribution is performed to the client via the network I/F 231 (ST167).

Next, whether to produce audio output for a moving object is determined (ST168).

When audio output is to be produced for a moving object, the real time controlling block 210 sets a sound volume in the audio input-output I/F 222 (ST169).

Next, an audio pattern stored in the application controlling block 230 is read, and copied to the audio memory of the real time controlling block 210 (ST170).

Next, the real time controlling block 210 encodes audio by a codec specified by the audio compressor 221 (ST171).

Next, whether to end output is determined (ST172).

The process of steps ST170 to ST172 is repeated until an output end. When output is to be ended, or when it is determined in step ST164 that the divided screen ID is not a valid ID, the audio response application is put to sleep (ST173).

2. A second example of practical use is a device that is interlocked with face detection and which notifies a message to a specific person.

On the basis of face information registered in advance, {monitoring information} is set as {face detection}.

In addition, a setting is made in the application controlling block 230 such that an application performing audio streaming distribution and an application outputting audio from the camera device 200 starts in response to a (monitoring object).

Thereby, when a certain moving object enters a {monitoring object} and {face detection} is performed, for example, bidirectional telephone conversation between the moving object and a monitoring person is automatically enabled.

3. A third example of practical use is a device that outputs audio for guiding to a specific area according to a place where a moving object is detected.

A plurality of {monitoring objects} (for example an entrance and the like) are set as (moving object detection).

In addition, a setting is made in the application controlling block 230 such that an application performing audio streaming distribution starts in response to a {monitoring notification}.

In addition, suppose that the application to be started sets a different audio pattern for each {monitoring object}.

Thus, by setting, as audio for each entrance, for example, means for going from the area to a specific area, a moving object can be automatically guided to the specific area.

4. A fourth example of practical use is a device that allows telephone conversation between a moving object and a monitoring person when the moving object is detected.

For a specific area, a {monitoring object} is set as {moving object detection}.

In addition, a setting is made in the application controlling block 230 such that an application performing audio streaming distribution and an application outputting audio from the camera device 200 starts in response to a {monitoring notification}.

Thereby, when a moving object enters the specific area, for example, {moving object detection} is performed, and bidirectional telephone conversation between the moving object and a monitoring person is automatically enabled.

As described above, the second embodiment can provide the following effects.

It is possible to respond to requests from a plurality of clients, for example a detecting process and enlarging/reducing screen operation on an input image in the camera device 200.

The camera device 200 can perform streaming distribution. Therefore the client side can perform real time monitoring.

A process of simultaneously detecting different objects such as moving object detection and non-moving object detection or the like can be performed. Therefore the client side can perform efficient monitoring.

The camera device 200 can transmit an image to which information on a detected object is added. Therefore the client side can perform monitoring easily.

The streaming distribution can be turned on/off dynamically. Therefore an amount of information received by the client can be reduced.

Ordinary monitoring systems can also be constructed easily.

It is possible to increase images that can be generated and deal with many clients by adding converters and synthesizers.

By making moving object detection and face detection cooperate with an application related to audio, the state of a moving object can be notified to the moving object and a monitoring person without an operation by the client.

In addition, according to the second embodiment, even when a delay in such an encoding process occurs, the skipping of an identical instance can be avoided because encoding order makes rotation. Thus video degradation is reduced. Remarkable effects can be obtained especially when the frame rate of each instance is the same.

The image processing methods described above in detail can also be formed as a program corresponding to the above-described procedures and configured so as to be executed by a computer having a CPU and the like.

Such a program can be configured to be accessed by a recording medium such as a semiconductor memory, a magnetic disk, an optical disk, a floppy (registered trademark) disk or the like and a computer in which the recording medium is loaded so that the program is executed.

The present application contains subject matter related to that disclosed in Japanese Priority Patent Applications JP 2009-113884, JP2009-045512, both filed in the Japan Patent Office on May 8, 2009, on Feb. 27, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a detecting section configured for selectively detecting a plurality of objects of a plurality of types from an input image, wherein the plurality of types of objects includes:
moving objects,
faces, and
stationary objects;
a generating section configured to generate, for a given image frame of the input image, one converted image frame for each type of object detected by the detection section, where each converted image frame is based on the given frame of the input image and corresponds to one of the plurality of types of objects detected by the detecting section; and
a processing section configured to selectively subject the converted frames to processing, wherein the processing includes generating an output image frame comprising a synthesis of more than one of the converted image frames for the given image frame,
wherein the processing section is configured to be capable of selectively synthesizing a plurality of sub-images into the output image, wherein the sub-images selectable by the processing section for synthesizing into the output image include:
an image generated by combining an On-Screen Display (foreground image) with an image corresponding to the given image frame of the input image,
a converted image frame generated by combining an On-Screen Display (foreground image) with an image corresponding to one of the types of objects detected by the detecting section and adding detection information to the image, the detection information being information indicating those objects that were detected by the detecting section, appear in the image, and are of the type corresponding to the converted image frame,
a converted image frame generated by combining an On-Screen Display (foreground image) with an image corresponding to one of the types of objects detected by the detecting section, said image comprising a zoomed in portion of said given image frame corresponding to one those objects that were detected by the detecting section and are of the type corresponding to the converted image frame
wherein the image processing device is configured such that a user may select one or more of the plurality of detected objects to be monitored objects, and
wherein the plurality of sub-images synthesized by the processing section into the output image includes at least one converted image frame for each monitored object, each converted image frame for a monitored object being generated by combining an On-Screen Display (foreground image) with an image corresponding to the type of the respective monitored object and comprising a zoomed in portion of said given image frame corresponding to the respective monitored object.

2. The image processing device according to claim 1, wherein said generating section is configured to selectively combine an independent On-Screen Display (foreground image) with a converted image frame and output a result thereof as a converted image frame.

3. The image processing device according to claim 1, wherein said generating section has a function capable of, when generating a given converted image frame, without affecting other converted image frames, electronically zooming and panning/tilting the given frame of the input image such that the given converted image frame corresponds to a targeted portion of the given frame of the input image.

4. The image processing device according to claim 1, wherein said generating section generates a converted image frame by combining an On-Screen Display (foreground image) with an image corresponding to one of the types of objects detected by the detecting section and adding detection information to the image, the detection information being information indicating those objects that were detected by the detecting section, appear in the image, and are of the type corresponding to the converted image frame.

5. The image processing device according to claim 1, wherein said processing section has a function of performing streaming distribution of a plurality of generated images to different communicating devices.

6. The image processing device according to claim 5, wherein said processing section has a function of storing an image in streaming distribution.

7. The image processing device according to claim 1, wherein said detecting section has a function of, when a non-moving object is detected, determining an elapsed time from a point in time at which the non-moving object was initially detected as a non-moving object to a present time, and
said generating section generates a converted image frame corresponding to the non-moving object type of object by adding time data indicating the elapsed time to image data corresponding to the detected non-moving object.

8. The image processing device according to claim 1, further comprising an audio processing system,
wherein, when a moving object is detected, said processing section is configured to notify a distance from the moving object to a specific area by driving said audio processing system and changing a response sound according to a position at which the moving object is detected.

9. The image processing device according to claim 8, wherein said processing section has a function of driving said audio processing system and outputting audio for guiding to the specific area according to the position at which the moving object is detected.

10. The image processing device according to claim 1, further comprising an audio processing system,
wherein, when a face is detected, said processing section is configured to drive said audio processing system and perform streaming distribution of audio according to information obtained by detecting said face, and to output the audio to another communicating device.

11. An image processing system comprising:
a network;

an image processing device capable of communication via said network; and at least one communicating device capable of communication with said image processing device via said network;

wherein said image processing device includes a detecting section configured for selectively detecting a plurality of objects of a plurality of types from an input image, wherein the plurality of types of objects includes: moving objects, faces, and stationary objects;

a generating section configured to generate, for a given image frame of the input image, one converted image frame for each type of object detected by the detection section, where each converted image frame is based on the given frame of the input image and corresponds to one of the plurality of types of objects detected by the detecting section; and a processing section configured to selectively subject the converted frames to processing, wherein the processing includes generating an output image frame comprising a synthesis of more than one of the converted image frames for the given image frame, wherein the processing section is configured to be capable of selectively synthesizing a plurality of sub-images into the output image, wherein the sub-images selectable by the processing section for synthesizing into the output image include:

an image generated by combining an On-Screen Display (foreground image) with an image corresponding to the given image frame of the input image, a converted image frame generated by combining an On-Screen Display (foreground image) with an image corresponding to one of the types of objects detected by the detecting section and adding detection information to the image, the detection information being information indicating those objects that were detected by the detecting section, appear in the image, and are of the type corresponding to the converted image frame, a converted image frame generated by combining an On-Screen Display (foreground image) with an image corresponding to one of the types of objects detected by the detecting section, said image comprising a zoomed in portion of said given image frame corresponding to one those objects that were detected by the detecting section and are of the type corresponding to the converted image frame wherein the image processing device is configured such that a user may select one or more of the plurality of detected objects to be monitored objects, and wherein the plurality of sub-images synthesized by the processing section into the output image includes at least one converted image frame for each monitored object, each converted image frame for a monitored object being generated by combining an On-Screen Display (foreground image) with an image corresponding to the type of the respective monitored object and comprising a zoomed in portion of said given image frame corresponding to the respective monitored object.

12. A camera device comprising:

an image pickup section configured to obtain picked-up image data; and an image processing device configured to subject the image data obtained by said image pickup section to image processing;

wherein said image processing includes a detecting section configured for selectively detecting a plurality of objects of a plurality of types from an input image, wherein the plurality of types of objects includes: moving objects, faces, and stationary objects;

a generating section configured to generate, for a given image frame of the input image, one converted image frame for each type of object detected by the detection section, where each converted image frame is based on the given frame of the input image and corresponds to one of the plurality of types of objects detected by the detecting section; and a processing section configured to selectively subject the converted frames to processing, wherein the processing includes generating an output image frame comprising a synthesis of more than one of the converted image frames for the given image frame, wherein the processing section is configured to be capable of selectively synthesizing a plurality of sub-images into the output image, wherein the sub-images selectable by the processing section for synthesizing into the output image include:

an image generated by combining an On-Screen Display (foreground image) with an image corresponding to the given image frame of the input image, a converted image frame generated by combining an On-Screen Display (foreground image) with an image corresponding to one of the types of objects detected by the detecting section and adding detection information to the image, the detection information being information indicating those objects that were detected by the detecting section, appear in the image, and are of the type corresponding to the converted image frame, a converted image frame generated by combining an On-Screen Display (foreground image) with an image corresponding to one of the types of objects detected by the detecting section, said image comprising a zoomed in portion of said given image frame corresponding to one those objects that were detected by the detecting section and are of the type corresponding to the converted image frame wherein the image processing device is configured such that a user may select one or more of the plurality of detected objects to be monitored objects, and wherein the plurality of sub-images synthesized by the processing section into the output image includes at least one converted image frame for each monitored object, each converted image frame for a monitored object being generated by combining an On-Screen Display (foreground image) with an image corresponding to the type of the respective monitored object and comprising a zoomed in portion of said given image frame corresponding to the respective monitored object.

13. An image processing device comprising:

detecting means for selectively detecting a plurality of objects of a plurality of types from one input image wherein the plurality of types of objects includes:
moving objects,
faces, and
stationary objects;

generating means for generating, for a given frame of the input image, one converted image frame for each type of object detected by the detection section, where each converted image frame is based on the given frame of the input image and corresponds to one of the plurality of types of objects detected by the detecting means; and processing means for selectively subjecting the converted image frames to processing according to one of a setting and a request, wherein the processing includes generating an output image frame comprising a synthesis of more than one of the converted image frames for the given image frame, wherein the processing means is configured to be capable of selectively synthesizing a plurality of sub-images into the output image, wherein the sub-images selectable by the processing section for synthesizing into the output image include:

an image generated by combining an On-Screen Display (foreground image) with an image corresponding to the given image frame of the input image, a converted image frame generated by combining an On-Screen Display (foreground image) with an image corresponding to one of the types of objects detected by the detecting section and adding detection information to the image, the detection information being information indicating those objects that were detected by the detecting section, appear in the image, and are of the type corresponding to the converted image frame, a converted image frame generated by combining an On-Screen Display (foreground image) with an image corresponding to one of the types of objects detected by the detecting section, said image comprising a zoomed in portion of said given image frame corresponding to one those objects that were detected by the detecting section and are of the type corresponding to the converted image frame wherein the image processing device is configured such that a user may select one or more of the plurality of detected objects to be monitored objects, and wherein the plurality of sub-images synthesized by the processing means into the output image includes at least one converted image frame for each monitored object, each converted image frame for a monitored object being generated by combining an On-Screen Display (foreground image) with an image corresponding to the type of the respective monitored object and comprising a zoomed in portion of said given image frame corresponding to the respective monitored object.

14. The image processing device of claim 4, wherein the detection information comprises one or more shapes that are superimposed on the image so as to severally surround those objects that were detected by the detecting section, appear in the image, and are of the type corresponding to the converted image frame.

15. The image processing device of claim 2, wherein said generating section generates a converted image frame by combining an On-Screen Display (foreground image) with an image corresponding to one of the types of objects detected by the detecting section, said image comprising a zoomed in portion of said given image frame corresponding to one those objects that were detected by the detecting section and are of the type corresponding to the converted image frame.

16. The image processing device of claim 1, wherein the image processing device is configured such that a user may select one or more detecting functions corresponding to the plurality of types of objects, wherein the detecting section detects objects of those types corresponding to the selected detecting functions.

17. The image processing device of claim 16, wherein the output image comprises a synthesis of an image corresponding to the given image frame of the input image and converted images corresponding to those types corresponding to the selected detecting functions.

18. The image processing device of claim 1, wherein the output image comprises a synthesis of:
an image corresponding to the given image frame of the input image,
a converted image corresponding to moving objects,
a converted image corresponding to stationary objects, and
a converted image corresponding to faces.

* * * * *